(12) United States Patent
Curr et al.

(10) Patent No.: US 8,746,044 B2
(45) Date of Patent: *Jun. 10, 2014

(54) METHODS USING FORMATE GELS TO CONDITION A PIPELINE OR PORTION THEREOF

(75) Inventors: Jack Curr, The Woodlands, TX (US); Brian Hallett, Cypress, TX (US); Alan Sweeney, Houston, TX (US)

(73) Assignee: Clearwater International LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,819

(22) Filed: Jan. 11, 2012

(65) Prior Publication Data

US 2012/0115758 A1    May 10, 2012

Related U.S. Application Data

(62) Division of application No. 12/167,645, filed on Jul. 3, 2008, now Pat. No. 8,099,997.

(51) Int. Cl.
*G01M 3/02*    (2006.01)
*F17D 1/05*    (2006.01)
*F17D 3/14*    (2006.01)

(52) U.S. Cl.
USPC ......... 73/49.5; 137/15.01; 507/90; 405/154.1

(58) Field of Classification Search
CPC ........ G01M 3/02; B08B 9/0555; F16L 55/42; F16L 55/46; F17D 1/05; F17D 3/14; F17D 3/145
USPC ..................... 73/49.5; 405/154.1, 158, 184.1; 137/15.01; 507/90
See application file for complete search history.

(56) References Cited

U.S. PATENT DOCUMENTS

| | | |
|---|---|---|
| 2,196,042 A | 4/1940 | Timpson |
| 2,390,153 A | 12/1945 | Kern |
| 3,059,909 A | 10/1962 | Wise |
| 3,163,219 A | 12/1964 | Wyant et al. |
| 3,301,723 A | 1/1967 | Chrisp |
| 3,301,848 A | 1/1967 | Halleck |
| 3,303,896 A | 2/1967 | Tillotson et al. |
| 3,317,430 A | 5/1967 | Priestley et al. |
| 3,565,176 A | 2/1971 | Wittenwyler |
| 3,856,921 A | 12/1974 | Shrier et al. |
| 3,888,312 A | 6/1975 | Tiner et al. |
| 3,933,205 A | 1/1976 | Kiel |
| 3,937,283 A | 2/1976 | Blauer et al. |
| 3,960,736 A | 6/1976 | Free et al. |
| 3,965,982 A | 6/1976 | Medlin |
| 3,990,978 A | 11/1976 | Hill |
| 4,007,792 A | 2/1977 | Meister |
| 4,052,159 A | 10/1977 | Fuerst et al. |
| 4,067,389 A | 1/1978 | Savins |
| 4,108,782 A | 8/1978 | Thompson |
| 4,112,050 A | 9/1978 | Sartori et al. |
| 4,112,051 A | 9/1978 | Sartori et al. |
| 4,112,052 A | 9/1978 | Sartori et al. |
| 4,113,631 A | 9/1978 | Thompson |
| 4,378,845 A | 4/1983 | Medlin et al. |
| 4,461,716 A | 7/1984 | Barbarin et al. |
| 4,479,041 A | 10/1984 | Fenwick et al. |
| 4,506,734 A | 3/1985 | Nolte |
| 4,514,309 A | 4/1985 | Wadhwa |
| 4,541,935 A | 9/1985 | Constien et al. |
| 4,549,608 A | 10/1985 | Stowe et al. |
| 4,561,985 A | 12/1985 | Glass, Jr. |
| 4,623,021 A | 11/1986 | Stowe |
| 4,654,266 A | 3/1987 | Kachnik |
| 4,657,081 A | 4/1987 | Hodge |
| 4,660,643 A | 4/1987 | Perkins |
| 4,683,068 A | 7/1987 | Kucera |
| 4,686,052 A | 8/1987 | Baranet et al. |
| 4,695,389 A | 9/1987 | Kubala |
| 4,705,113 A | 11/1987 | Perkins |
| 4,714,115 A | 12/1987 | Uhri |
| 4,718,490 A | 1/1988 | Uhri |
| 4,724,905 A | 2/1988 | Uhri |
| 4,725,372 A | 2/1988 | Teot et al. |
| 4,739,834 A | 4/1988 | Peiffer et al. |

(Continued)

FOREIGN PATENT DOCUMENTS

| | | |
|---|---|---|
| CA | 2125513 | 1/1995 |
| CA | 2007965 | 2/1996 |

(Continued)

OTHER PUBLICATIONS

Fadnes F H et al: "Studies on the prevention of gas hydrates formation in pipelines USing Potassium Formales as a thermodynamic inhibitor", Proceedings of the European Petroleum conference, vol. 2, Oct. 20, 1998, pp. 497-506.
EPO Office Action, Application No. 08760618.2-1252, Nov. 17, 2011.
AU Office Action, Application No. 2008267947, Dec. 16, 2010.
PCT Written Opinion PCT/EP2008/057044, Sep. 29, 2008.

*Primary Examiner* — Daniel S Larkin

(74) *Attorney, Agent, or Firm* — Robert W. Strozier

(57) ABSTRACT

A gelled composition for pipeline, flowline, pipeline jumper or flowline jumper dewatering or preventing ingress of seawater into open pipeline systems or components during tie-in operations of jumpers or additional pipe, valving, manifolds, subsea pipeline architecture or flow conduits operations is disclosed, where the composition includes a concentrated metal formate solution and a hydratable polymer. The gelled formate compositions have improved dewatering properties with 100% or 360 pipe coverage. The gelled formate compositions have can also be reused by breaking and reformulation.

17 Claims, 10 Drawing Sheets

(56) References Cited

U.S. PATENT DOCUMENTS

| | | | |
|---|---|---|---|
| 4,741,401 | A | 5/1988 | Walles et al. |
| 4,748,011 | A | 5/1988 | Baize |
| 4,779,680 | A | 10/1988 | Sydansk |
| 4,795,574 | A | 1/1989 | Syrinek et al. |
| 4,817,717 | A | 4/1989 | Jennings, Jr. et al. |
| 4,830,106 | A | 5/1989 | Uhri |
| 4,846,277 | A | 7/1989 | Khalil et al. |
| 4,848,468 | A | 7/1989 | Hazlett et al. |
| 4,852,650 | A | 8/1989 | Jennings, Jr. et al. |
| 4,869,322 | A | 9/1989 | Vogt, Jr. et al. |
| 4,892,147 | A | 1/1990 | Jennings, Jr. et al. |
| 4,926,940 | A | 5/1990 | Stromswold |
| 4,938,286 | A | 7/1990 | Jennings, Jr. |
| 4,978,512 | A | 12/1990 | Dillon |
| 5,005,645 | A | 4/1991 | Jennings, Jr. et al. |
| 5,024,276 | A | 6/1991 | Borchardt |
| 5,067,556 | A | 11/1991 | Fudono et al. |
| 5,074,359 | A | 12/1991 | Schmidt |
| 5,074,991 | A | 12/1991 | Weers |
| 5,082,579 | A | 1/1992 | Dawson |
| 5,106,518 | A | 4/1992 | Cooney et al. |
| 5,110,486 | A | 5/1992 | Manalastas et al. |
| 5,169,411 | A | 12/1992 | Weers |
| 5,224,546 | A | 7/1993 | Smith et al. |
| 5,228,510 | A | 7/1993 | Jennings, Jr. et al. |
| 5,228,909 | A * | 7/1993 | Burdick et al. ............ 106/162.8 |
| 5,246,073 | A | 9/1993 | Sandiford et al. |
| 5,259,455 | A | 11/1993 | Nimerick et al. |
| 5,330,005 | A | 7/1994 | Card et al. |
| 5,342,530 | A | 8/1994 | Aften et al. |
| 5,347,004 | A | 9/1994 | Rivers et al. |
| 5,363,919 | A | 11/1994 | Jennings, Jr. |
| 5,402,846 | A | 4/1995 | Jennings, Jr. et al. |
| 5,411,091 | A | 5/1995 | Jennings, Jr. |
| 5,424,284 | A | 6/1995 | Patel et al. |
| 5,439,055 | A | 8/1995 | Card et al. |
| 5,462,721 | A | 10/1995 | Pounds et al. |
| 5,465,792 | A | 11/1995 | Dawson et al. |
| 5,472,049 | A | 12/1995 | Chaffee et al. |
| 5,482,116 | A | 1/1996 | El-Rabaa et al. |
| 5,488,083 | A | 1/1996 | Kinsey, III et al. |
| 5,497,831 | A | 3/1996 | Hainey et al. |
| 5,501,275 | A | 3/1996 | Card et al. |
| 5,551,516 | A | 9/1996 | Norman et al. |
| 5,624,886 | A | 4/1997 | Dawson et al. |
| 5,635,458 | A | 6/1997 | Lee et al. |
| 5,649,596 | A | 7/1997 | Jones et al. |
| 5,669,447 | A | 9/1997 | Walker et al. |
| 5,674,377 | A | 10/1997 | Sullivan, III et al. |
| 5,688,478 | A | 11/1997 | Pounds et al. |
| 5,693,837 | A | 12/1997 | Smith et al. |
| 5,711,396 | A | 1/1998 | Joerg et al. |
| 5,722,490 | A | 3/1998 | Ebinger |
| 5,744,024 | A | 4/1998 | Sullivan, III et al. |
| 5,755,286 | A | 5/1998 | Ebinger |
| 5,775,425 | A | 7/1998 | Weaver et al. |
| 5,787,986 | A | 8/1998 | Weaver et al. |
| 5,806,597 | A | 9/1998 | Tjon-Joe-Pin et al. |
| 5,807,812 | A | 9/1998 | Smith et al. |
| 5,833,000 | A | 11/1998 | Weaver et al. |
| 5,846,450 | A * | 12/1998 | Atkinson ........................ 252/69 |
| 5,853,048 | A | 12/1998 | Weaver et al. |
| 5,871,049 | A | 2/1999 | Weaver et al. |
| 5,877,127 | A | 3/1999 | Card et al. |
| 5,908,073 | A | 6/1999 | Nguyen et al. |
| 5,908,814 | A | 6/1999 | Patel et al. |
| 5,964,295 | A | 10/1999 | Brown et al. |
| 5,979,557 | A | 11/1999 | Card et al. |
| 5,980,845 | A | 11/1999 | Cherry |
| 6,016,871 | A | 1/2000 | Burts, Jr. |
| 6,035,936 | A | 3/2000 | Whalen |
| 6,047,772 | A | 4/2000 | Weaver et al. |
| 6,054,417 | A | 4/2000 | Graham et al. |
| 6,059,034 | A | 5/2000 | Rickards et al. |
| 6,060,436 | A | 5/2000 | Snyder et al. |
| 6,069,118 | A | 5/2000 | Hinkel et al. |
| 6,123,394 | A | 9/2000 | Jeffrey |
| 6,133,205 | A | 10/2000 | Jones |
| 6,147,034 | A | 11/2000 | Jones et al. |
| 6,162,449 | A | 12/2000 | Maier et al. |
| 6,162,766 | A | 12/2000 | Muir et al. |
| 6,169,058 | B1 | 1/2001 | Le et al. |
| 6,228,812 | B1 | 5/2001 | Dawson et al. |
| 6,247,543 | B1 | 6/2001 | Patel et al. |
| 6,267,938 | B1 | 7/2001 | Warrender et al. |
| 6,283,212 | B1 | 9/2001 | Hinkel et al. |
| 6,291,405 | B1 | 9/2001 | Lee et al. |
| 6,330,916 | B1 | 12/2001 | Rickards et al. |
| 6,539,778 | B2 * | 4/2003 | Tucker et al. .................. 73/49.5 |
| 6,725,931 | B2 | 4/2004 | Nguyen et al. |
| 6,756,345 | B2 | 6/2004 | Pakulski et al. |
| 6,793,018 | B2 | 9/2004 | Dawson et al. |
| 6,832,650 | B2 | 12/2004 | Nguyen et al. |
| 6,840,088 | B2 * | 1/2005 | Tucker et al. .................. 73/49.5 |
| 6,875,728 | B2 | 4/2005 | Gupta et al. |
| 7,093,655 | B2 * | 8/2006 | Atkinson ...................... 166/266 |
| 7,140,433 | B2 | 11/2006 | Gatlin et al. |
| 7,268,100 | B2 | 9/2007 | Kippie et al. |
| 7,268,101 | B2 * | 9/2007 | van Batenburg et al. ..... 507/211 |
| 7,350,579 | B2 | 4/2008 | Gatlin et al. |
| 7,565,933 | B2 | 7/2009 | Kippie et al. |
| 7,708,839 | B2 * | 5/2010 | Yemington ................. 134/22.11 |
| 7,712,535 | B2 | 5/2010 | Venditto et al. |
| 7,829,510 | B2 | 11/2010 | Gatlin et al. |
| 7,989,404 | B2 | 8/2011 | Kakadjian et al. |
| 7,992,653 | B2 | 8/2011 | Zamora et al. |
| 8,034,750 | B2 | 10/2011 | Thompson et al. |
| 8,065,905 | B2 | 11/2011 | Sweeney et al. ............... 73/49.5 |
| 8,084,401 | B2 | 12/2011 | Lukocs et al. |
| 8,158,562 | B2 | 4/2012 | Wilson, Jr. et al. |
| 8,172,952 | B2 | 5/2012 | Wanner et al. |
| 2002/0049256 | A1 | 4/2002 | Bergeron, Jr. |
| 2002/0165308 | A1 | 11/2002 | Kinniard et al. |
| 2003/0220204 | A1 | 11/2003 | Baran, Jr. et al. |
| 2004/0198611 | A1 | 10/2004 | Atkinson |
| 2005/0045330 | A1 | 3/2005 | Nguyen et al. |
| 2005/0092489 | A1 | 5/2005 | Welton et al. |
| 2005/0137114 | A1 | 6/2005 | Gatlin et al. |
| 2005/0153846 | A1 | 7/2005 | Gatlin |
| 2005/0250666 | A1 | 11/2005 | Gatlin et al. |
| 2006/0194700 | A1 | 8/2006 | Gatlin et al. |
| 2007/0003371 | A1 * | 1/2007 | Yemington ................ 405/154.1 |
| 2007/0032693 | A1 | 2/2007 | Gatlin et al. |
| 2007/0129257 | A1 | 6/2007 | Kippie et al. |
| 2007/0131425 | A1 | 6/2007 | Gatlin et al. |
| 2007/0173414 | A1 | 7/2007 | Wilson, Jr. |
| 2008/0039345 | A1 | 2/2008 | Kippie et al. |
| 2008/0251252 | A1 | 10/2008 | Schwartz |
| 2008/0318812 | A1 | 12/2008 | Kakadjian, Sr. et al. |

FOREIGN PATENT DOCUMENTS

| | | |
|---|---|---|
| DE | 4027300 | 3/1992 |
| EP | 0730018 A1 | 9/1996 |
| GB | 816337 A | 7/1959 |
| GB | 1073338 A | 6/1967 |
| JP | 10001461 | 1/1988 |
| JP | 08151422 | 6/1996 |
| JP | 10110115 A | 4/1998 |
| JP | 2005194148 A | 7/2005 |
| WO | WO 98/56497 | 12/1998 |
| WO | WO 02/096574 | * 12/2002 |

* cited by examiner

METHODS USING FORMATE GELS TO CONDITION A PIPELINE OR PORTION THEREOF

RELATED APPLICATIONS

This application is a divisional claiming priority to and the benefit of U.S. patent application Ser. No. 12/167,645, filed 3 Jul. 2008 (Jul. 3, 2008), now U.S. Pat. No. 8,099,997 issued 24 Jan. 2012 (Jan. 24, 2012).

BACKGROUND OF THE INVENTION

1. Field of the Invention

The present invention relates to a gelled, aqueous, metal ion formate salt composition for the prevention of seawater ingress during subsea pipeline tie-in operations and for the removal of seawater and conditioning of residual seawater film left on the pipewall during and following pipeline or flowline dewatering operations, which may involve the use of a pig or a plurality of pigs.

More particularly, the present invention relates to a method and a use of a gelled metal ion formate composition for pipeline or flowline operations. In certain embodiments, the metal ion formate starting solution is a concentrated metal ion formate solution including at least 40 wt. % of a metal ion formate or mixture thereof. The method includes the step of filling an interior or a section of a pipeline, flowline, pipeline jumper or flowline jumper with the gelled composition, where the composition includes a metal ion formate solution and an effective amount of a gelling agent sufficient to gel the solution and where the composition reduces substantially all or part of a residual water film from the interior of the pipeline, flowline, pipeline jumper or flowline jumper during a dewatering operation, or minimize or prevent the ingress of seawater into open pipeline systems or components during tie-in operations of jumpers or additional pipe, valving, manifolds, subsea pipeline architecture or flow conduits. The gelled metal ion formate salt composition is effective in reducing a water concentration of a residual film in a pipeline formed during a dewatering operation, where the dewatering operation may involve the use of a pig or multiple pigs. A slug of the gelled metal ion formate salt composition can be added to the dewatering pig train in order to achieve an improved result.

2. Description of the Related Art

To date fluids such as methanol and glycols including in gelled form are utilized for dewatering pipeline or flowline applications offshore and constantly exceed the acceptable limitations for both subsea and overboard discharge. A liquid product that Weatherford International, Inc. supplies made up of a concentrated metal ion formate solution including at least 40 wt. % of a metal ion formate or mixture thereof of potassium formate is a newly accepted liquid product generally utilized to provide hydrate control; however, the establishment of a potassium formate gel provides equally good performance in regards to dewatering applications or minimization or prevention of seawater ingress in addition to hydrate control, while being less hazardous, and less environmentally damaging.

Historically, methanol and glycols, both of which pose immediate safety concerns as well as being potentially hazardous, have been utilized for dewatering pipelines and flowlines offshore. Secondly, these fluids are considered to be toxic for overboard discharge.

Thus, there is a need in the art for compositions that address these safety issues as well as overboard discharge problems associated with chemicals for dewatering pipelines in addition to an increase in dewatering performance capabilities/potentials.

SUMMARY OF THE INVENTION

The present invention provides an improved system for dewatering and conditioning pipelines or flowlines, where the system includes a composition comprising a metal ion formate solution and an effective amount of a gelling agent, where the effective amount is sufficient to gel the composition and the composition is effective in reducing an amount of bulk water and/or an amount of residual water in the pipeline or flowline, reducing an amount of a residual water film in a pipeline or flowline below a desired amount, removing substantially all of the residual water in the pipeline or flowline, or effectively preventing seawater ingress into open pipeline systems or components during tie-in operations of jumpers or additional pipe, valving, manifolds, subsea pipeline architecture or flow conduits The present invention also provides a method for dewatering a pipeline or flowline including the step of pumping, into a pipeline or flowline, pipeline jumper or flowline jumper, a composition comprising a metal ion formate solution and an effective amount of a gelling agent, where the effective amount is sufficient to gel the composition and the composition is effective in reducing an amount of a residual water film in the pipeline, flowline, pipeline jumper or flowline jumper, reducing an amount of the residual water film in a pipeline, flowline, pipeline jumper or flowline jumper below a desired amount, removing substantially the residual water film in the pipeline, flowline, pipeline jumper or flowline jumper or preventing ingress of seawater. into open pipeline systems or components during tie-in operations of jumpers or additional pipe, valving, manifolds, subsea pipeline architecture or flow conduits The method can also include the step of recovering the gelled composition, breaking the gelled composition, filtering the gelled composition and reformulating the gelled composition for reuse. Because the potassium formate compositions are considered to be environmentally benign, some or all of the composition can be pumped into a marine environment without pretreatment.

The present invention also provides a method for installing a pipeline or flowline including the step of filling a pipeline, flowline, pipeline jumper or flowline jumper with a gelled composition of this invention. After the pipeline, flowline, pipeline jumper or flowline jumper is filled, the pipeline is installed, at a subsea location. After installation the pipeline, flowline, pipeline jumper or flowline jumper on occasion may be pressurized using an external water source. After pressure testing, the pipeline is brought on production by displacing the composition and the fill medium of the pipeline, flowline, pipeline jumper or flowline jumper, with production fluids or gases to the ocean without the need for treatment. By using the composition of this invention, hydrate formation is precluded during the composition displacement operation. In certain embodiments, the pressure testing is performed at a pressure that is a percentage of the maximum allowable operating pressure or a specific percentage of the pipeline design pressure. In other embodiments, the pressure testing is performed at a pressure between about 1.25 and about 1.5 times the operating pressure. Of course, an ordinary artisan would understand that the pressure testing can be at any desired pressure.

BRIEF DESCRIPTION OF THE DRAWINGS

The invention can be better understood with reference to the following detailed description together with the appended illustrative drawings in which like elements are numbered the same.

DEFINITIONS USED IN THE INVENTION

Figure 1A:
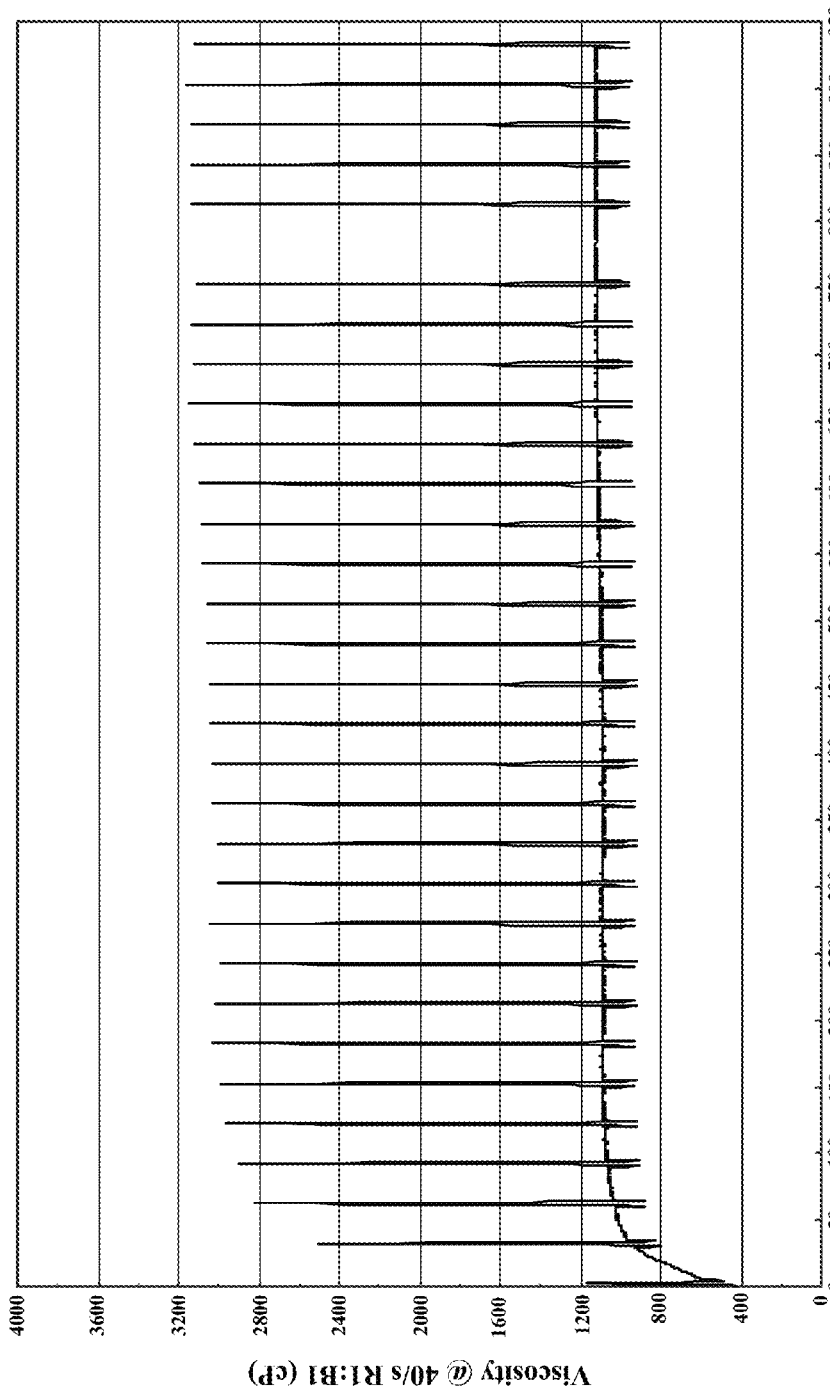
FIG. 1A a plot of testing of a clarified Xanthan-CMHPG gelled formate composition.
Figure 1B:
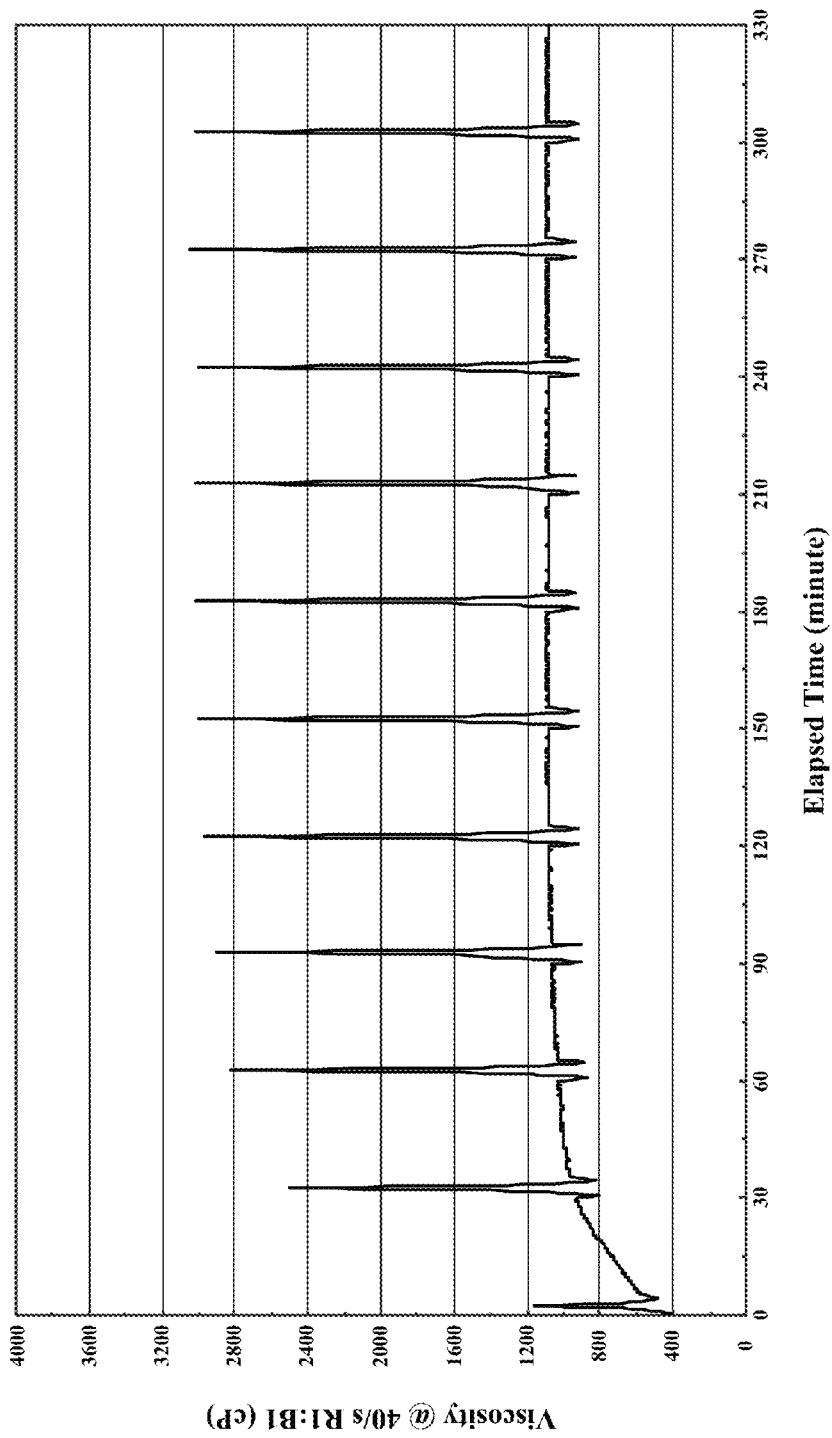
FIG. 1B a plot of the testing of FIG. 1A through the first 330 minutes.
Figure 2:
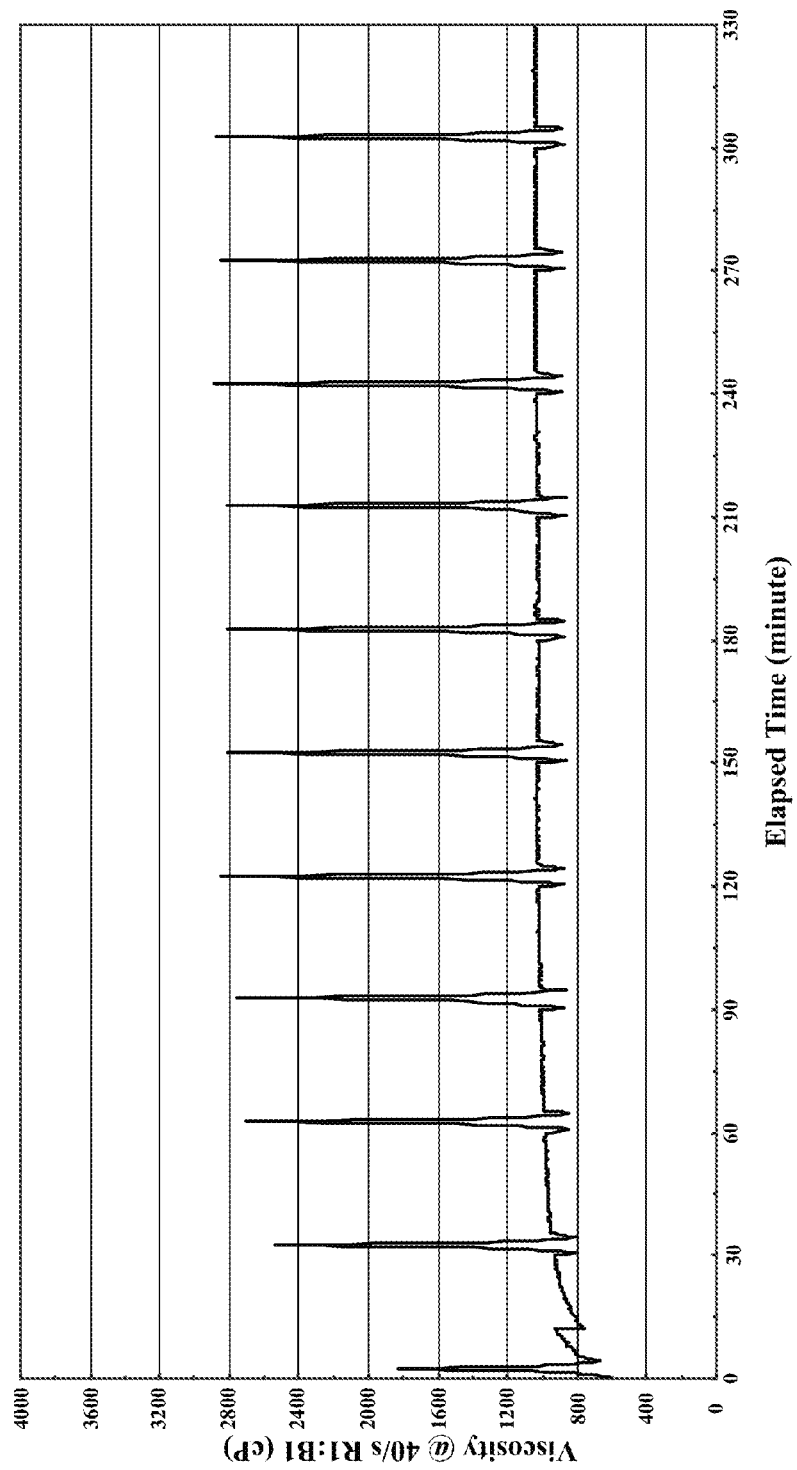
FIG. 2 a plot of testing of a 80 ppt CMHPG dry polymer gelled formate composition.
Figure 3:
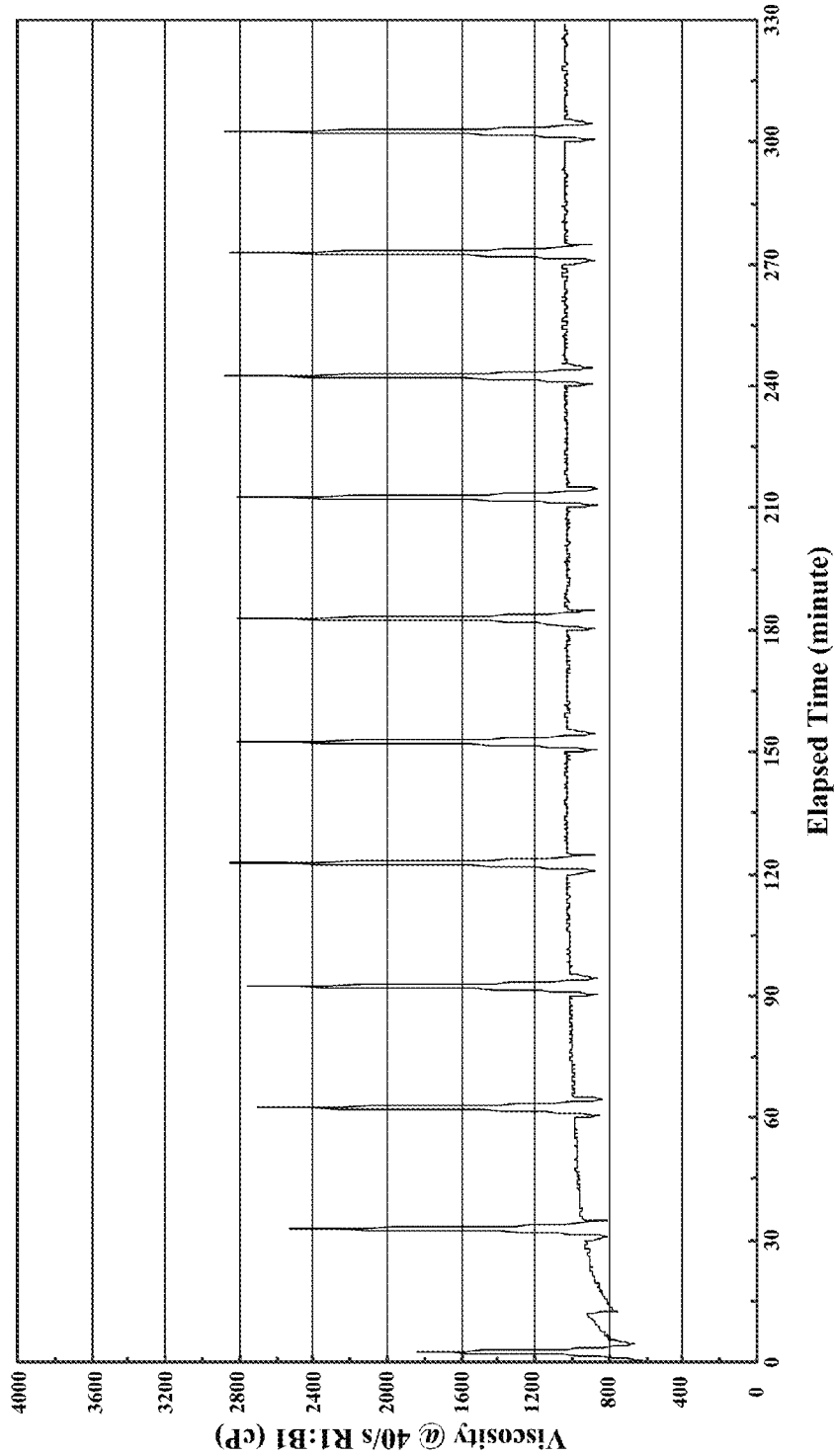
FIG. 3 a plot of the testing of a CMHPG-Xanthan 80-20 w-w gelled formate composition.
Figure 4:
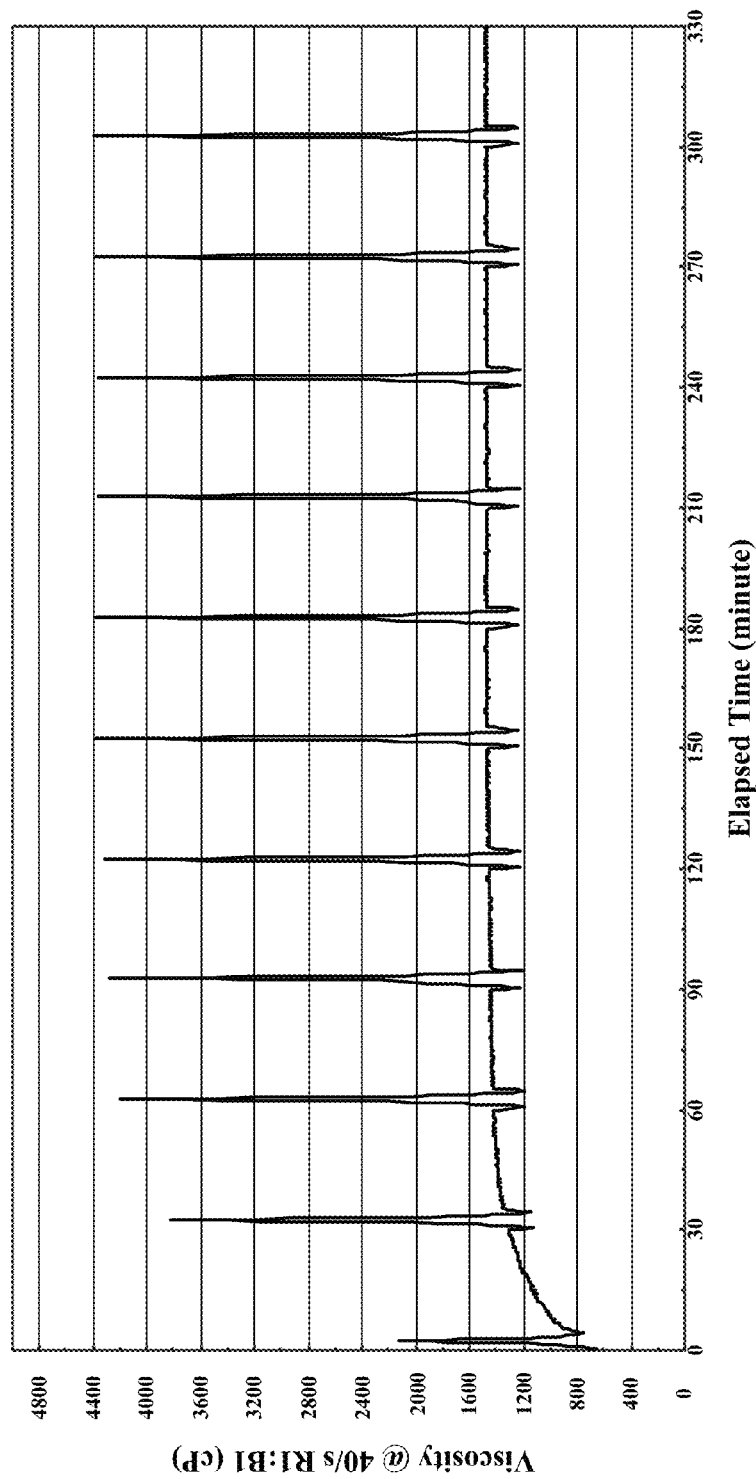
FIG. 4 a plot of the testing of a CMHPG-130 gelled formate composition.

The term "substantially" means that the actual value is within about 5% of the actual desired value, particularly within about 2% of the actual desired value and especially within about 1% of the actual desired value of any variable, element or limit set forth herein.

The term "residual film" means a water film left in a pipeline, flowline, pipeline jumper or flowline jumper after a pig bulk dewatering operation. For carbon steel pipelines, a water residual film of about 0.1 mm is generally left in the pipeline. The present composition is used to change the make up of the residual film coating the pipeline to a film having at least 70% w/w of the aqueous, metal ion formate salt composition of this invention and 30% w/w residual water. In certain embodiments, the residual film comprises at least 80% w/w of the aqueous, metal ion formate salt composition of this invention and 20% w/w residual water. In certain embodiments, the residual film comprises at least 90% w/w of the aqueous, metal ion formate salt composition of this invention and 10% w/w residual water. In certain embodiments, the residual film comprises at least 95% w/w of the aqueous, metal ion formate salt composition of this invention and 5% w/w residual water. In certain embodiments, the residual film comprises at least 99% w/w of the aqueous, metal ion formate salt composition of this invention and 1% w/w residual water. Of course, for other pipeline, flowline, pipeline jumper or flowline jumper materials, the film make up can vary, but generally it will be within these ranges. Of course, the final make up of the residual film coating the pipeline will depend on operating conditions and is adjusted so that the water content is below a dew point of pure water under the operating conditions.

The term "formate" means the salt of formic acid $HCOO^-$.

The term "metal ion formate salt" means the salt of formic acid $HCOOH^-M^+$, where $M^+$ is a metal ion.

The term "sub-freezing temperature" means a temperature below the freezing point of pure water.

The term "gpt" means gallons per thousand gallons.

The term "ppt" means pounds per thousand gallons.

The term "HPG" means hydroxypropyl guar.

The term "CMHPG" means carboxymethylhydroxypropyl guar.

DETAILED DESCRIPTION OF THE INVENTION

The inventors have found that a new gelled composition can be formulated for use in pipeline, flowline, pipeline jumper or flowline jumper dewatering, conditioning or preventing ingress of seawater. into open pipeline systems or components during tie-in operations of jumpers or additional pipe, valving, manifolds, subsea pipeline architecture or flow conduits and/or pressure testing operations, where the new fluid is capable of being used without environmental consideration. The new gelled composition comprises a gelled metal ion formate solution. These compositions are well suited for pipeline flowline, pipeline jumper or flowline jumper dewatering operations, pipeline flowline, pipeline jumper or flowline jumper repair operations, pipeline flowline, pipeline jumper or flowline jumper pressure testing operations, pipeline flowline, pipeline jumper or flowline jumper conditioning operations, pipeline flowline, pipeline jumper or flowline jumper hydrotesting operations or other pipeline flowline, pipeline jumper or flowline jumper operations without being concerned with collecting and disposing of the compositions as is true for competing dewatering fluids such as glycol containing fluids or alcohol containing fluids. Moreover, the gelled compositions are also recyclable, where the gel can be broken, filtered and the recovered formate solution regelled. Of course, the formate ion concentration may need adjusting.

The inventors have found that gelled compositions of metal ion formates such as potassium formate, marketed as Superdry 2000 by Weatherford International, is an alternative for many pipeline applications. The gelled formate compositions have similar conditioning properties to currently used fluids such as methanol and glycols, without the hazards associated with methanol and glycols. Non-gelled formate solutions, such as potassium formate solutions, are known to be non-toxic and suitable for discharge directly into marine environments, without further processing. The ability to discharge formate solutions directly into marine environments is of particular benefit as it avoids the handling of typically large volumes of methanol or glycol containing fluids. In a previous application, assignee's employees demonstrated that formate solutions are well suited in pipeline applications as a substitute for alcohol and glycol dewatering and testing fluids, U.S. patent application Ser. No. 11/767,384, filed Jun. 22, 2007, incorporated herein by reference, even though all references are incorporated by reference through the last paragraph before the claims.

The use of a gelled metal formate compositions for dewatering pipelines flowline, pipeline jumper or flowline jumper or preventing ingress of seawater. into open pipeline systems or components during tie-in operations of jumpers or additional pipe, valving, manifolds, subsea pipeline architecture or flow conduits proved to have an added benefit compared to fluids such as methanol and glycols due to the formation of a gel column. In addition, the gel column established is compatible with all metal alloys and elastomers. Furthermore, the gelled formate compositions can be reused by breaking the gel column, filtering the debris out of the resulting fluid, and regelling the recovered formate solution with or without the adjustment of formate concentration, pH, etc.

The gel column established using of the gelled formate compositions of this invention provides a 100% (360 degree) coverage of the pipewall, compared to only about 60% coverage with the use of fluids, thus improving the dewatering capabilities/potentials. Dewatering applications constantly are in high demand in the Gulf of Mexico and improved product performance are of extreme and immediate interest.

Chemicals such as biocides, corrosion inhitors, oxygen scavengers, dyes, polymers or surfactants can optionally be added to the composition as needed for the intended application.

Purpose

To date fluids such as methanol and glycols utilized for dewatering pipeline, flowline, pipeline jumper or flowline jumper applications offshore constantly exceed the acceptable limitations for both subsea and overboard discharge. Potassium formate solutions are generally utilized to provide hydrate control; however, more recently, formate solutions have been used in dewatering application. Such formate solutions likely will not suffer from the same regulatory restrictions as do methanol and glycol and do not suffer from other problems associated with alcohols and glycols. However, these formate solutions are not gelled and do not form gel columns. Gelled compositions have significant advantages over solutions as they are less prone to leakage, are less prone to flowing, and represent a more controlled dewatering environment especially for off shore and sub sea applications.

The purpose of this project is to develop and confirm gelled formate compositions. A gelled formate composition would effectively increase the efficiency as well as the viscosity of pipeline fluid(s), where the gel found result from gelling a formate solution having at least about 50 wt. of a metal formate or mixture of metal formates. In certain embodiments, the formate solution includes at least 60 wt. % of a metal formate or mixture of metal formates. In other embodiments, the formate solution includes at least 70 wt. % of a metal formate or mixture of metal formates. These gelled compositions are designed for, but not limited to, use in pipeline drying or cleaning processes/applications. These gelled composition are designed to maintain viscosity for several hours at temperatures between about 70° F. and about 75° F. under shear rates ranging from about 40/s to 100/s without any significant viscosity degradation.

Suitable Reagents

Suitable metal ion formate salts for use in this invention include, without limitation, a compound of the general formula $(HCOO^-)_n M^{n+}$ and mixtures or combinations thereof, where M is a metal ion as set forth above and n is the valency of the metal ion.

Suitable metal ions for use in this invention include, without limitation, alkali metal ions, alkaline metal ions, transition metal ions, lanthanide metal ions, and mixtures or combinations thereof. The alkali metal ions are selected from the group consisting of $Li^+$, $Na^+$, $K^+$, $Rd^+$, $Cs^+$, and mixtures or combinations thereof. The alkaline metal ions are selected from the group consisting of $Mg^{2+}$, $Ca^{2+}$, $Sr^{2+}$, $Ba^{2+}$ and mixtures or combinations thereof. In certain embodiments, the transition metal ions are selected from the group consisting of $Ti^{4+}$, $Zr^{4+}$, $Hf^{4+}$, $Zn^{2+}$ and mixtures or combinations thereof. In certain embodiments, the lanthanide metal ions are selected from the group consisting of $La^{3+}$, $Ce^{4+}$, $Pr^{2+}$, $Pr^{3+}$, $Pr^{4+}$, $Sm^{2+}$, $Sm^{3+}$, $Gd^{3+}$, $Dy^{2+}$, $Dy^{3+}$, and mixtures or combinations thereof.

Suitable polymers for use in the present invention to gel a formate solution includes, without limitation, hydratable polymers. Exemplary examples includes polysaccharide polymers, high-molecular weight polysaccharides composed of mannose and galactose sugars, or guar derivatives such as hydropropyl guar (HPG), hydroxypropylcellulose (HPC), carboxymethyl guar (CMG), carboxymethylhydropropyl guar (CMHPG), hydroxyethylcellulose (HEC) or hydroxypropylcellulose (HPC), carboxymethylhydroxyethylcellulose (CMHEC), Xanthan, scleroglucan, polyacrylamide, polyacrylate polymers and copolymers or mixtures thereof.

Compositional Ranges

For dewatering or the prevention of seawater ingress applications, the general concentration range of metal ion formate salt in water is between about 40% w/w and supersaturation. In certain embodiments, the concentration range of metal ion formate salt in water is between about 45% w/w and supersaturation. In other embodiments, the concentration range of metal ion formate salt in water is between about 50% w/w and supersaturation. In other embodiments, the concentration range of metal ion formate salt in water is between about 55% w/w and supersaturation. In other embodiments, the concentration range of metal ion formate salt in water is between about 60% w/w and supersaturation. In other embodiments, the concentration range of metal ion formate salt in water is between about 65% w/w and supersaturation. In other embodiments, the concentration range of metal ion formate salt in water is between about 70% w/w and supersaturation. In other embodiments, the concentration range of metal ion formate salt in water is sufficient to prepare a supersaturated solution. Of course one of ordinary art would understand that the concentration will depend on the required reduction in the amount of bulk and/or residual water left in the pipeline. In certain embodiments, the amount of metal ion formate salt in water can result in a supersaturated solution, where residual water in the pipeline will dilute the solution form supersaturated to saturated or below during the dewatering operation.

EXPERIMENTS OF THE INVENTION

Introduction

Assignee has used aqueous potassium formate solutions in pipeline drying or dewatering application and other pipeline application as set forth in U.S. patent application Ser. No. 11/767,384, filed Jun. 22, 2007. However these fluids suffer dilution over the course of pipeline dewatering resulting in loss of effective transport of water as the drying process proceeds to completion. We then set out to increase the viscosity of these formate solutions to more effectively allow the fluid to convey water or other debris through the pipeline as it is being dried or cleaned. Earlier efforts at drying with high viscosity compositions revolved around formulation using biopolymers like xanthan gum. Xanthan gum has been one of the polymers effectively use used in pipeline cleaning and drying, for example in gel pigging. Formulations including mixtures of Xanthan and other polysaccharides have higher viscosity over a broad shear rate range. Such formulations have demonstrated their cost effectiveness in other technologies. Graft copolymers of polysaccharides and polyacrylates have also proven to be effective formulations in other technologies.

Xanthan Gum Chemistry

Xanthan gum is produced by fermenting glucose or sucrose in the presence of a *xanthomonas campestris* bacterium. The polysaccharide backbone comprises two β-d-glucose units linked through the 1 and 4 positions. The side chain comprise two (2) mannose residues and one (1) glucuronic acid residue, so the polymer comprises repeating five (5) sugar units. The side chain is linked to every other glucose of the backbone at the 3 position. About half of the terminal mannose residues have a pyruvic acid group linked as a ketal to its 4 and 6 positions. The other mannose residue has an acetal group at the 6 positions. Two of these chains may be aligned to form a double helix, giving a rather rigid rod configuration that accounts for its high efficiency as a viscosifier of water. The molecular weight of xanthan gums varies from about one million to 50 million depending upon how it is prepared. An idealized chemical structure of xanthan polymer is shown below:

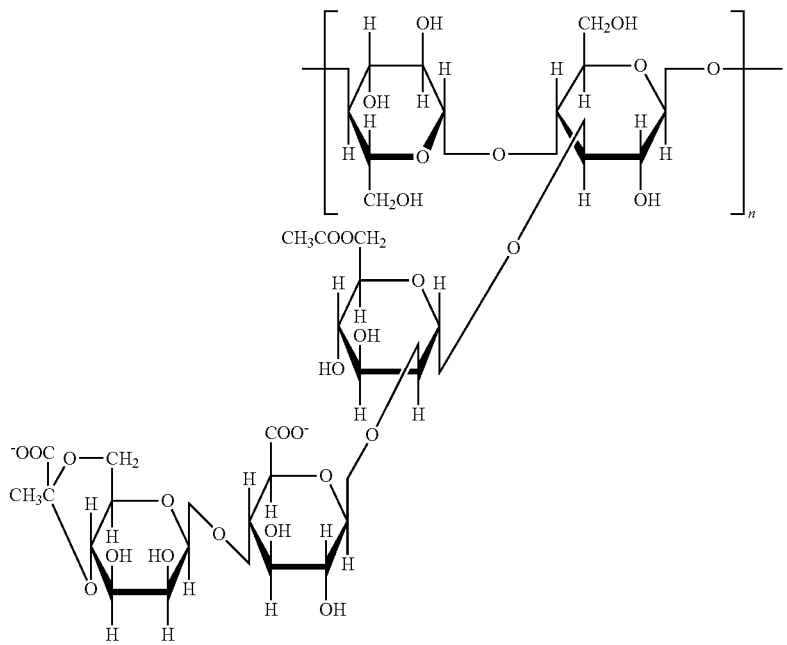

Guar Gum Chemistry

Guar Chemistry-Guar gum (also called guaran) is extracted from the seed of the leguminous shrub *Cyamopsis tetragonoloba*, where it acts as a food and water store. Structurally, guar gum is a galactomannan comprising a (1→4)-linked β-d-mannopyranose backbone with branch points from their 6-positions linked to α-d-galactose (that is, 1→6-linked-α-d-galactopyranose). There are between 1.5-2 mannose residues for every galactose residue. Guar gums molecular structure is made up of non-ionic polydisperse rod-shaped polymers comprising molecules made up of about 10,000 residues. Higher galactose substitution also increases the stiffness, but reduces the overall extensibility and radius of gyration of the isolated chains. The galactose residues prevent strong chain interactions as few unsubstituted clear areas have the minimum number (about 6) required for the formation of junction zones. Of the different possible galactose substitution patterns, the extremes of block substitution and alternating substitution give rise to the stiffer, with greater radius of gyration, and most flexible conformations respectively (random substitution being intermediate). If the galactose residues were perfectly randomized, it unlikely that molecules would have more than one such area capable of acting as a junction zone, so disallowing gel formation. A block substitution pattern, for which there is some experimental evidence, would allow junction zone formation if the blocks were of sufficient length. Enzymatic hydrolysis of some of the galactose side chains is possible using legume a-galactosidase. An idealized chemical structure of a guar gum is shown below:

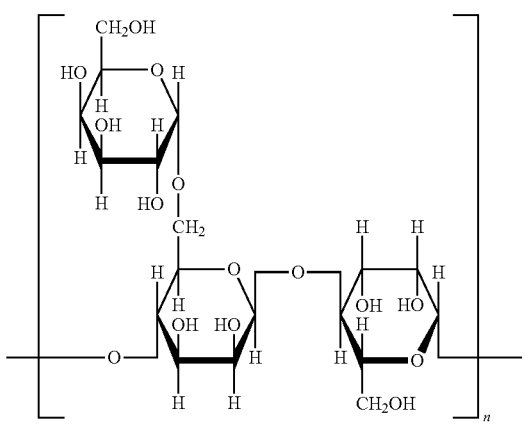

Derivatized guar polymer can be obtained by reaction with propylene oxide and/or chloracetic acid producing hydroxypropylguar (HPG) and carboxymethylhydroxypropylguar (CMHPG). These reaction products have enhanced hydration properties. The carboxyl functionality allows for polymer crosslinking at low pH levels less than 7. Idealized structure of HPG and CMHPG are shown below:

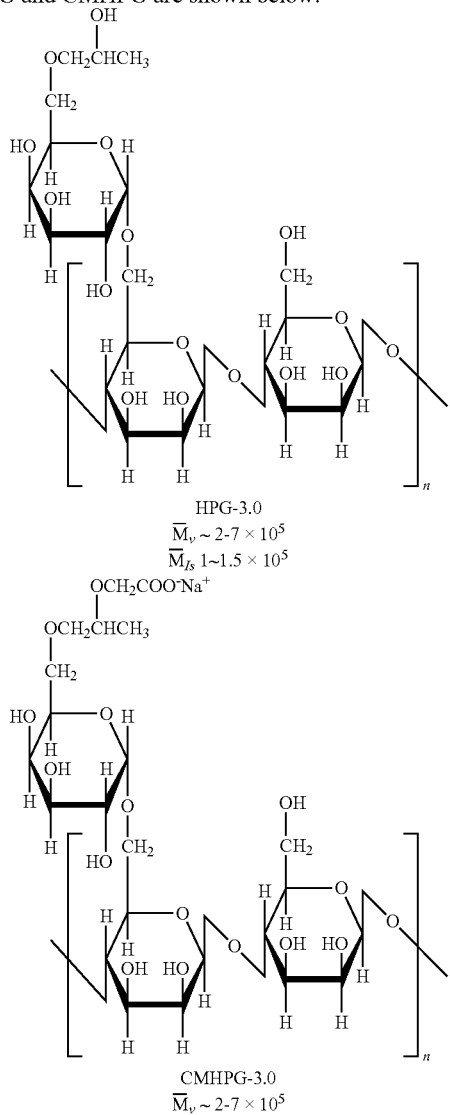

Guar gum is an economical thickener and stabilizer. It hydrates fairly rapidly in cold water to give highly viscous pseudo plastic solutions of generally greater low-shear viscosity when compared with other hydrocolloids and much greater than that of locust bean gum. High concentrations (~1%) are very thixotropic but lower concentrations (~0.3%) are far less so. Guar gum is more soluble than locust bean gum and a better emulsifier as it has more galactose branch points. Unlike locust bean gum, it does not form gels but does show good stability to freeze-thaw cycles. Guar gum shows high low-shear viscosity but is strongly shear-thinning Being non-ionic, it is not affected by ionic strength or pH but will degrade at pH extremes at temperature (for example, pH 3 at 50° C.). It shows viscosity synergy with xanthan gum. With casein, it becomes slightly thixotropic forming a biphasic system containing casein micelles. Guar gum retards ice crystal growth non-specifically by slowing mass transfer across solid/liquid interface.

General Preparation Method

We tested several formulations using a seventy (weight percent 70 wt. %) potassium formate base fluid and a polymer to form composition having significantly improved viscosity properties. Several polymers were tested along with combinations of polymers to study their properties. The polymer tested were guar, hydroxypropyl guar (HPG), carboxymethylhydroxypropyl guar (CMHPG) and "clarified" xanthan gum. We also discovered that the pH of formate solutions was generally above about pH 9. This high pH was found to inhibit polymer hydration when using certain natural polysaccharide polymers. The inventors found that by adjusting the pH of the base formate fluid to a pH between about 7 and about 7.5 using an acetic anhydride-glacial acetic acid composition improved polymer hydration and gel formation.

Polymers were then dispersed into the pH adjusted formate solution, while the formate solution was mixed. In certain embodiments, mixing was performed at 2500 rpm using an O.F.I.T.E. constant speed mixer apparatus. The mixing continued for about 5 minutes. The inventors also found polymer slurries or suspensions were more efficiently disperse into the formate solution than dry polymers. However, dry polymers can be used with additional mixing and/or shearing.

After preparation, a small aliquot of the gelled composition was taken, and the viscosity stability of the aliquot was measured versus time at about 75° F. for more than 900 minutes. Shear sweeps were made at 30 minutes intervals during the 900 minute test period. The viscosity measurements were made using an automated Grace Instrument high temperature-high pressure rotational M5500 viscometer following standard testing procedures for that apparatus. The 900 minute period was used to simulate residence time that such a composition would be expected to encounter in a typical pipeline cleaning project. The rotor-bob geometry was R1:B1. The interim shear rates were 40 and 100 reciprocal seconds ($s^{-1}$) as shown in Tables 1A through 7C and graphically in FIGS. 1 through 7. Indices of n' and k' fluid flow and fluid consistency were calculated from shear stress measurements at varying shear rate.

TABLE 1A

| Test Description | |
|---|---|
| Test Name: | TEST-5207 |
| Fluid ID: | Hydro Gel 5L PIPELINE |
| Rotor Number: | R1 |
| Bob Number: | B1 |
| Bob Radius (cm) | 1.7245 |

TABLE 1A-continued

Test Description

| | |
|---|---|
| Bob Eff. Length (cm): | 7.62 |
| Pre-Test pH: | 0 |
| Post-Test pH: | 0 |
| Description: | SHEAR RATE: 50/S |

TABLE 1B

Formulation and Test Conditions

| Additives | Concentration | Units | Lot Number | Conditions |
|---|---|---|---|---|
| 70% KCOOH | 1000 | GPT | | zero time @ temperature = 1.1 minutes |
| BIOCLEAR 200 | 0.05 | GPT | Russia | maximum sample temperature = 79.0° F. |
| Hydro Gel 5L | 16 | GPT | Batch K06-420 | time at excess temperature = 0.0 minutes |
| Hydro Buffer 552L | 10 | GPT | | total test duration = 935.1 minutes |
| Clarified Xanthan Gum | 4 | GPT | L0110012 | initial viscosity = 413.3 cP cool down viscosity = N.R.cP cool down temperature = N.R.° F. |

TABLE 2A

Test Description

| | |
|---|---|
| Test Name: | TEST-5206 |
| Fluid ID: | CMHPG PIPELINE |
| Rotor Number: | R1 |
| Bob Number: | B1 |
| Bob Radius (cm) | 1.7245 |
| Bob Eff. Length (cm): | 7.62 |
| Pre-Test pH: | 7.55 |
| Post-Test pH: | 0 |
| Description: | SHEAR RATE: 50/S |

TABLE 2A

Formulation and Test Conditions

| Additives | Concentration | Units | Lot Number | Conditions |
|---|---|---|---|---|
| 70% KCOOH | 1000 | gpt | | zero time @ temperature = 1.1 minutes |
| BioClear 200 | 0.05 | gpt | Russia | maximum sample temperature = 79.0° F. |
| CMHPG-130:Xanthan (80:20 w/w) | 80 | ppt | Batch #L0222098 | time at excess temperature = 0.0 minutes |
| Hydro Buffer 552L | 10 | gpt | | total test duration = 935.1 minutes initial viscosity = 413.3 cP cool down viscosity = N.R. cP |

TABLE 1C

Test Data

| Time (min) | Temp (° F.) | n' | Kv dyne-s$^{n'}$/cm$^2$ | R$^2$ | K' dyne-s$^{n'}$/cm$^2$ | K' Slot dyne-s$^{n'}$/cm$^2$ | Calc. cP @40 (1/s) | Calc. cP @100 (1/s) | Calc. cP @170 (1/s) |
|---|---|---|---|---|---|---|---|---|---|
| 5 | 77 | 0.4045 | 0.0951 | 0.9363 | 0.0916 | 0.1077 | 573 | 332 | 242 |
| 35 | 75 | 0.2997 | 0.2618 | 0.9970 | 0.2506 | 0.2978 | 1077 | 567 | 391 |
| 65 | 74 | 0.2749 | 0.3130 | 0.9990 | 0.2992 | 0.3559 | 1174 | 604 | 411 |
| 95 | 74 | 0.2770 | 0.3212 | 0.9991 | 0.3071 | 0.3652 | 1214 | 626 | 427 |
| 125 | 75 | 0.2713 | 0.3322 | 0.9990 | 0.3175 | 0.3776 | 1229 | 631 | 428 |
| 155 | 75 | 0.2683 | 0.3379 | 0.9992 | 0.3228 | 0.3840 | 1237 | 632 | 429 |
| 185 | 75 | 0.2662 | 0.3410 | 0.9993 | 0.3257 | 0.3874 | 1238 | 632 | 428 |
| 215 | 75 | 0.2674 | 0.3389 | 0.9991 | 0.3238 | 0.3852 | 1236 | 632 | 428 |
| 245 | 75 | 0.2666 | 0.3398 | 0.9984 | 0.3246 | 0.3861 | 1236 | 631 | 428 |
| 275 | 74 | 0.2633 | 0.3460 | 0.9992 | 0.3305 | 0.3931 | 1243 | 633 | 428 |
| 305 | 74 | 0.2659 | 0.3415 | 0.9994 | 0.3263 | 0.3881 | 1239 | 632 | 428 |
| 335 | 75 | 0.2678 | 0.3380 | 0.9995 | 0.3230 | 0.3842 | 1235 | 631 | 428 |
| 365 | 75 | 0.2646 | 0.3427 | 0.9991 | 0.3274 | 0.3894 | 1237 | 631 | 427 |
| 395 | 75 | 0.2635 | 0.3435 | 0.9995 | 0.3281 | 0.3902 | 1235 | 629 | 425 |
| 425 | 75 | 0.2609 | 0.3482 | 0.9993 | 0.3326 | 0.3956 | 1240 | 630 | 425 |
| 455 | 74 | 0.2604 | 0.3488 | 0.9989 | 0.3331 | 0.3963 | 1239 | 629 | 425 |
| 485 | 74 | 0.2623 | 0.3485 | 0.9997 | 0.3329 | 0.3959 | 1247 | 635 | 429 |
| 515 | 73 | 0.2601 | 0.3510 | 0.9996 | 0.3352 | 0.3987 | 1246 | 632 | 427 |
| 545 | 73 | 0.2597 | 0.3538 | 0.9995 | 0.3379 | 0.4019 | 1254 | 636 | 430 |
| 575 | 73 | 0.2601 | 0.3547 | 0.9996 | 0.3387 | 0.4029 | 1259 | 639 | 431 |
| 605 | 73 | 0.2576 | 0.3581 | 0.9995 | 0.3419 | 0.4067 | 1259 | 638 | 430 |
| 635 | 72 | 0.2594 | 0.3583 | 0.9997 | 0.3422 | 0.4070 | 1268 | 643 | 434 |
| 665 | 72 | 0.2543 | 0.3649 | 0.9999 | 0.3483 | 0.4143 | 1267 | 640 | 431 |
| 695 | 72 | 0.2577 | 0.3606 | 0.9997 | 0.3443 | 0.4095 | 1268 | 642 | 433 |
| 725 | 72 | 0.2559 | 0.3630 | 0.9997 | 0.3466 | 0.4123 | 1268 | 641 | 432 |
| 755 | 72 | 0.2664 | 0.3506 | 0.9993 | 0.3350 | 0.3984 | 1274 | 650 | 441 |
| 785 | 72 | 0.2562 | 0.3641 | 0.9986 | 0.3476 | 0.4135 | 1273 | 644 | 434 |
| 815 | 72 | 0.2605 | 0.3596 | 0.9995 | 0.3434 | 0.4084 | 1278 | 649 | 438 |
| 845 | 72 | 0.2620 | 0.3575 | 0.9996 | 0.3415 | 0.4062 | 1278 | 650 | 439 |
| 875 | 71 | 0.2591 | 0.3614 | 0.9991 | 0.3452 | 0.4106 | 1278 | 648 | 438 |
| 905 | 72 | 0.2535 | 0.3685 | 0.9997 | 0.3518 | 0.4184 | 1276 | 644 | 433 |
| 935 | 71 | 0.2642 | 0.3552 | 0.9995 | 0.3393 | 0.4036 | 1280 | 652 | 442 |

TABLE 2A-continued

Formulation and Test Conditions

| Additives | Concentration | Units | Lot Number | Conditions |
|---|---|---|---|---|
| | | | | cool down temperature = N.R. ° F. |

TABLE 2C

Test Data

| Time (min) | Temp (° F.) | n' | Kv dyne-s$^{n'}$/cm$^2$ | R$^2$ | K' dyne-s$^{n'}$/cm$^2$ | K' Slot dyne-s$^{n'}$/cm$^2$ | Calc. cP @40 (1/s) | Calc. cP @100 (1/s) | Calc. cP @170 (1/s) |
|---|---|---|---|---|---|---|---|---|---|
| 5 | 75 | 0.3444 | 0.1736 | 0.9653 | 0.1666 | 0.1973 | 842 | 462 | 326 |
| 35 | 74 | 0.2899 | 0.2700 | 0.9973 | 0.2583 | 0.3071 | 1071 | 559 | 383 |
| 65 | 75 | 0.2781 | 0.2969 | 0.9991 | 0.2839 | 0.3376 | 1127 | 582 | 397 |
| 95 | 75 | 0.2773 | 0.3047 | 0.9990 | 0.2912 | 0.3464 | 1153 | 595 | 405 |
| 125 | 74 | 0.2677 | 0.3198 | 0.9995 | 0.3055 | 0.3634 | 1168 | 597 | 405 |
| 155 | 75 | 0.2762 | 0.3107 | 0.9988 | 0.2970 | 0.3532 | 1171 | 603 | 411 |
| 185 | 75 | 0.2713 | 0.3151 | 0.9998 | 0.3011 | 0.3581 | 1166 | 598 | 406 |
| 215 | 74 | 0.2661 | 0.3208 | 0.9974 | 0.3065 | 0.3645 | 1164 | 594 | 403 |
| 245 | 73 | 0.2666 | 0.3252 | 0.9985 | 0.3107 | 0.3696 | 1183 | 604 | 409 |
| 275 | 73 | 0.2727 | 0.3185 | 0.9991 | 0.3044 | 0.3621 | 1185 | 609 | 414 |
| 305 | 74 | 0.2668 | 0.3244 | 0.9993 | 0.3100 | 0.3687 | 1181 | 603 | 409 |
| 335 | 74 | 0.2682 | 0.3237 | 0.9989 | 0.3093 | 0.3678 | 1184 | 606 | 411 |
| 365 | 73 | 0.2650 | 0.3265 | 0.9996 | 0.3119 | 0.3710 | 1180 | 602 | 408 |
| 395 | 74 | 0.2691 | 0.3214 | 0.9990 | 0.3071 | 0.3653 | 1180 | 604 | 410 |
| 425 | 74 | 0.2699 | 0.3200 | 0.9988 | 0.3058 | 0.3637 | 1178 | 603 | 410 |
| 455 | 74 | 0.2639 | 0.3274 | 0.9986 | 0.3127 | 0.3719 | 1178 | 600 | 406 |
| 485 | 73 | 0.2665 | 0.3259 | 0.9993 | 0.3114 | 0.3704 | 1185 | 605 | 410 |
| 515 | 73 | 0.2639 | 0.3305 | 0.9981 | 0.3157 | 0.3755 | 1190 | 606 | 410 |
| 545 | 73 | 0.2655 | 0.3297 | 0.9987 | 0.3150 | 0.3747 | 1194 | 609 | 413 |
| 575 | 72 | 0.2624 | 0.3331 | 0.9986 | 0.3182 | 0.3784 | 1193 | 607 | 410 |
| 605 | 72 | 0.2610 | 0.3367 | 0.9986 | 0.3216 | 0.3825 | 1199 | 609 | 412 |
| 635 | 72 | 0.2627 | 0.3364 | 0.9982 | 0.3213 | 0.3822 | 1206 | 614 | 415 |
| 665 | 72 | 0.2617 | 0.3376 | 0.9981 | 0.3224 | 0.3835 | 1205 | 613 | 414 |
| 695 | 72 | 0.2609 | 0.3391 | 0.9981 | 0.3239 | 0.3852 | 1207 | 613 | 414 |
| 725 | 72 | 0.2693 | 0.3298 | 0.9995 | 0.3152 | 0.3749 | 1212 | 620 | 421 |
| 755 | 72 | 0.2594 | 0.3428 | 0.9986 | 0.3274 | 0.3894 | 1214 | 616 | 416 |
| 785 | 72 | 0.2594 | 0.3428 | 0.9980 | 0.3274 | 0.3894 | 1213 | 616 | 416 |
| 815 | 72 | 0.2663 | 0.3344 | 0.9991 | 0.3195 | 0.3800 | 1215 | 620 | 420 |
| 845 | 72 | 0.2607 | 0.3411 | 0.9994 | 0.3258 | 0.3875 | 1214 | 616 | 416 |
| 875 | 72 | 0.2607 | 0.3436 | 0.9993 | 0.3282 | 0.3904 | 1222 | 621 | 419 |
| 905 | 72 | 0.2583 | 0.3468 | 0.9980 | 0.3311 | 0.3938 | 1222 | 620 | 418 |
| 935 | 71 | 0.2542 | 0.3519 | 0.9985 | 0.3360 | 0.3996 | 1222 | 617 | 415 |

TABLE 3A

Test Description

| | |
|---|---|
| Test Name: | TEST-5206 |
| Fluid ID: | HPG PIPELINE |
| Rotor Number: | R1 |
| Bob Number: | B1 |
| Bob Radius (cm) | 1.7245 |
| Bob Eff. Length (cm): | 7.62 |
| Pre-Test pH: | 7.55 |
| Post-Test pH: | 0 |
| Description: | SHEAR RATE: 50/S |

TABLE 3B

Formulation and Test Conditions

| Additives | Concentration | Units | Lot Number | Conditions |
|---|---|---|---|---|
| 70% KCOOH | 1000 | gpt | | zero time @ temperature = 0.6 minutes |
| BIOCLEAR 200 | 0.05 | gpt | Russia | maximum sample temperature = 77.2° F. |
| CMHPG-130:Xanthan (80:20 w/w) | 80 | ppt | Batch # L0222098 | time at excess temperature = 0.0 minutes |
| Hydro Buffer 552L | 10 | gpt | | total test duration = 935.1 minutes initial viscosity = 619.7 cP cool down viscosity = N.R. cP cool down temperature = N.R. ° F. |

TABLE 3C

Test Data

| Time (min) | Temp (° F.) | n' | Kv dyne-s$^{n'}$/cm$^2$ | R$^2$ | K' dyne-s$^{n'}$/cm$^2$ | K' Slot dyne-s$^{n'}$/cm$^2$ | Calc. cP @40 (1/s) | Calc. cP @100 (1/s) | Calc. cP @170 (1/s) |
|---|---|---|---|---|---|---|---|---|---|
| 5 | 75 | 0.3444 | 0.1736 | 0.9653 | 0.1666 | 0.1973 | 842 | 462 | 326 |
| 35 | 74 | 0.2899 | 0.2700 | 0.9973 | 0.2583 | 0.3071 | 1071 | 559 | 383 |
| 65 | 75 | 0.2781 | 0.2969 | 0.9991 | 0.2839 | 0.3376 | 1127 | 582 | 397 |
| 95 | 75 | 0.2773 | 0.3047 | 0.9990 | 0.2912 | 0.3464 | 1153 | 595 | 405 |
| 125 | 74 | 0.2677 | 0.3198 | 0.9995 | 0.3055 | 0.3634 | 1168 | 597 | 405 |
| 155 | 75 | 0.2762 | 0.3107 | 0.9988 | 0.2970 | 0.3532 | 1171 | 603 | 411 |
| 185 | 75 | 0.2713 | 0.3151 | 0.9998 | 0.3011 | 0.3581 | 1166 | 598 | 406 |
| 215 | 74 | 0.2661 | 0.3208 | 0.9974 | 0.3065 | 0.3645 | 1164 | 594 | 403 |
| 245 | 73 | 0.2666 | 0.3252 | 0.9985 | 0.3107 | 0.3696 | 1183 | 604 | 409 |
| 275 | 73 | 0.2727 | 0.3185 | 0.9991 | 0.3044 | 0.3621 | 1185 | 609 | 414 |
| 305 | 74 | 0.2668 | 0.3244 | 0.9993 | 0.3100 | 0.3687 | 1181 | 603 | 409 |
| 335 | 74 | 0.2682 | 0.3237 | 0.9989 | 0.3093 | 0.3678 | 1184 | 606 | 411 |
| 365 | 73 | 0.2650 | 0.3265 | 0.9996 | 0.3119 | 0.3710 | 1180 | 602 | 408 |
| 395 | 74 | 0.2691 | 0.3214 | 0.9990 | 0.3071 | 0.3653 | 1180 | 604 | 410 |
| 425 | 74 | 0.2699 | 0.3200 | 0.9988 | 0.3058 | 0.3637 | 1178 | 603 | 410 |
| 455 | 74 | 0.2639 | 0.3274 | 0.9986 | 0.3127 | 0.3719 | 1178 | 600 | 406 |
| 485 | 73 | 0.2665 | 0.3259 | 0.9993 | 0.3114 | 0.3704 | 1185 | 605 | 410 |
| 515 | 73 | 0.2639 | 0.3305 | 0.9981 | 0.3157 | 0.3755 | 1190 | 606 | 410 |
| 545 | 73 | 0.2655 | 0.3297 | 0.9987 | 0.3150 | 0.3747 | 1194 | 609 | 413 |
| 575 | 72 | 0.2624 | 0.3331 | 0.9986 | 0.3182 | 0.3784 | 1193 | 607 | 410 |
| 605 | 72 | 0.2610 | 0.3367 | 0.9986 | 0.3216 | 0.3825 | 1199 | 609 | 412 |
| 635 | 72 | 0.2627 | 0.3364 | 0.9982 | 0.3213 | 0.3822 | 1206 | 614 | 415 |
| 665 | 72 | 0.2617 | 0.3376 | 0.9981 | 0.3224 | 0.3835 | 1205 | 613 | 414 |
| 695 | 72 | 0.2609 | 0.3391 | 0.9981 | 0.3239 | 0.3852 | 1207 | 613 | 414 |
| 725 | 72 | 0.2693 | 0.3298 | 0.9995 | 0.3152 | 0.3749 | 1212 | 620 | 421 |
| 755 | 72 | 0.2594 | 0.3428 | 0.9986 | 0.3274 | 0.3894 | 1214 | 616 | 416 |
| 785 | 72 | 0.2594 | 0.3428 | 0.9980 | 0.3274 | 0.3894 | 1213 | 616 | 416 |
| 815 | 72 | 0.2663 | 0.3344 | 0.9991 | 0.3195 | 0.3800 | 1215 | 620 | 420 |
| 845 | 72 | 0.2607 | 0.3411 | 0.9994 | 0.3258 | 0.3875 | 1214 | 616 | 416 |
| 875 | 72 | 0.2607 | 0.3436 | 0.9993 | 0.3282 | 0.3904 | 1222 | 621 | 419 |
| 905 | 72 | 0.2583 | 0.3468 | 0.9980 | 0.3311 | 0.3938 | 1222 | 620 | 418 |
| 935 | 71 | 0.2542 | 0.3519 | 0.9985 | 0.3360 | 0.3996 | 1222 | 617 | 415 |

TABLE 4A

Test Description

| | |
|---|---|
| Test Name: | TEST-5192 |
| Fluid ID: | CMHPG PIPELINE |
| Rotor Number: | R1 |
| Bob Number: | B1 |
| Bob Radius (cm) | 1.7245 |
| Bob Eff. Length (cm): | 7.62 |
| Pre-Test pH: | 7.45 |
| Post-Test pH: | 7 |
| Description: | 50/S TEST |

TABLE 4B

Formulation and Test Conditions

| Additives | Concentration | Units | Lot Number | |
|---|---|---|---|---|
| 70% KCOOH | 1000 | gpt | | zero time @ temperature = 0.6 minutes |
| BioClear 200 | 0.05 | gpt | RUSSIA | maximum sample temperature = 76.0° F. |
| CMHPG-130 | 80 | ppt | LOT: H0601-055-D (P176-01) | time at excess temperature = 0.0 minutes |
| Hydro Buffer 552L | 10 | gpt | | total test duration = 935.1 minutes initial viscosity = 659.8 cP cool down viscosity = N.R. cP cool down temperature = N.R. ° F. |

TABLE 4C

Test Data

| Time (min) | Temp (° F.) | n' | Kv dyne-s$^{n'}$/cm$^2$ | R$^2$ | K' dyne-s$^{n'}$/cm$^2$ | K' Slot dyne-s$^{n'}$/cm$^2$ | Calc. cP @40 (1/s) | Calc. cP @100 (1/s) | Calc. cP @170 (1/s) |
|---|---|---|---|---|---|---|---|---|---|
| 5 | 72 | 0.3156 | 0.2120 | 0.9184 | 0.2031 | 0.2411 | 924 | 494 | 343 |
| 35 | 73 | 0.2424 | 0.4562 | 0.9947 | 0.4353 | 0.5175 | 1514 | 756 | 506 |
| 65 | 75 | 0.2205 | 0.5265 | 0.9993 | 0.5018 | 0.5958 | 1609 | 788 | 521 |
| 95 | 76 | 0.2174 | 0.5407 | 0.9994 | 0.5153 | 0.6116 | 1632 | 797 | 526 |

TABLE 4C-continued

Test Data

| Time (min) | Temp (° F.) | n' | Kv dyne-s$^{n'}$/cm$^2$ | R$^2$ | K' dyne-s$^{n'}$/cm$^2$ | K' Slot dyne-s$^{n'}$/cm$^2$ | Calc. cP @40 (1/s) | Calc. cP @100 (1/s) | Calc. cP @170 (1/s) |
|---|---|---|---|---|---|---|---|---|---|
| 125 | 75 | 0.2194 | 0.5428 | 0.9994 | 0.5173 | 0.6141 | 1651 | 808 | 534 |
| 155 | 74 | 0.2164 | 0.5537 | 0.9989 | 0.5276 | 0.6261 | 1665 | 812 | 536 |
| 185 | 74 | 0.2146 | 0.5581 | 0.9997 | 0.5317 | 0.6310 | 1667 | 812 | 535 |
| 215 | 75 | 0.2150 | 0.5553 | 0.9993 | 0.5290 | 0.6278 | 1661 | 809 | 533 |
| 245 | 75 | 0.2139 | 0.5574 | 0.9998 | 0.5310 | 0.6301 | 1661 | 808 | 532 |
| 275 | 75 | 0.2169 | 0.5532 | 0.9987 | 0.5272 | 0.6257 | 1667 | 813 | 537 |
| 305 | 75 | 0.2166 | 0.5554 | 0.9984 | 0.5292 | 0.6281 | 1671 | 815 | 538 |
| 335 | 74 | 0.2154 | 0.5578 | 0.9979 | 0.5314 | 0.6307 | 1671 | 814 | 537 |
| 365 | 74 | 0.2146 | 0.5600 | 0.9990 | 0.5336 | 0.6331 | 1673 | 815 | 537 |
| 395 | 74 | 0.2137 | 0.5583 | 0.9998 | 0.5319 | 0.6311 | 1662 | 808 | 533 |
| 425 | 74 | 0.2183 | 0.5493 | 0.9984 | 0.5234 | 0.6214 | 1664 | 813 | 537 |
| 455 | 74 | 0.2167 | 0.5518 | 0.9990 | 0.5258 | 0.6241 | 1661 | 811 | 535 |
| 485 | 74 | 0.2162 | 0.5531 | 0.9996 | 0.5270 | 0.6255 | 1662 | 811 | 535 |
| 515 | 74 | 0.2174 | 0.5516 | 0.9987 | 0.5256 | 0.6239 | 1665 | 813 | 537 |
| 545 | 74 | 0.2185 | 0.5493 | 0.9987 | 0.5235 | 0.6214 | 1666 | 814 | 538 |
| 575 | 74 | 0.2157 | 0.5540 | 0.9991 | 0.5278 | 0.6264 | 1662 | 810 | 534 |
| 605 | 74 | 0.2168 | 0.5526 | 0.9993 | 0.5266 | 0.6250 | 1665 | 812 | 536 |
| 635 | 74 | 0.2163 | 0.5519 | 0.9980 | 0.5259 | 0.6242 | 1659 | 809 | 534 |
| 665 | 74 | 0.2172 | 0.5508 | 0.9991 | 0.5249 | 0.6230 | 1662 | 811 | 535 |
| 695 | 74 | 0.2139 | 0.5583 | 0.9991 | 0.5319 | 0.6311 | 1663 | 809 | 533 |
| 725 | 73 | 0.2119 | 0.5613 | 0.9994 | 0.5347 | 0.6343 | 1659 | 806 | 530 |
| 755 | 73 | 0.2151 | 0.5574 | 0.9996 | 0.5311 | 0.6302 | 1668 | 812 | 536 |
| 785 | 73 | 0.2110 | 0.5651 | 0.9996 | 0.5383 | 0.6386 | 1665 | 808 | 532 |
| 815 | 73 | 0.2164 | 0.5556 | 0.9990 | 0.5295 | 0.6284 | 1671 | 815 | 538 |
| 845 | 73 | 0.2128 | 0.5628 | 0.9992 | 0.5362 | 0.6362 | 1669 | 811 | 534 |
| 875 | 73 | 0.2150 | 0.5591 | 0.9985 | 0.5327 | 0.6322 | 1673 | 815 | 537 |
| 905 | 73 | 0.2139 | 0.5609 | 0.9985 | 0.5344 | 0.6342 | 1671 | 813 | 536 |
| 935 | 73 | 0.2158 | 0.5561 | 0.9993 | 0.5298 | 0.6288 | 1669 | 813 | 536 |

TABLE 5A

Test Description

| | |
|---|---|
| Test Name: | TEST-5191- |
| Fluid ID: | HPG PIPELINE |
| Rotor Number: | R1 |
| Bob Number: | B1 |
| Bob Radius (cm) | 1.7245 |
| Bob Eff. Length (cm): | 7.62 |
| Pre-Test pH: | 7.45 |
| Post-Test pH: | 7 |
| Description: | 100/S TEST |

TABLE 5B

Formulation and Test Conditions

| Additives | Con-centration | Units | Lot Number | Conditions |
|---|---|---|---|---|
| 70% KCOOH | 1000 | gpt | | zero time @ temperature = 0.5 minutes |
| BIOCLEAR 200 | 0.05 | gpt | Russia | maximum sample temperature = 76.0° F. |
| CMHPG-130 | 80 | ppt | Lot: H0601-055-D (P176-01) | time at excess temperature = 0.0 minutes |
| Hydro Buffer 552L | 10 | gpt | | total test duration = 935.1 minutes initial viscosity = 179.9 cP cool down viscosity = N.R. cP cool down temperature = N.R. ° F. |

TABLE 5C

Test Data

| Time (min) | Temp (° F.) | n' | Kv dyne-s$^{n'}$/cm$^2$ | R$^2$ | K' dyne-s$^{n'}$/cm$^2$ | K' Slot dyne-s$^{n'}$/cm$^2$ | Calc. cP @40 (1/s) | Calc. cP @100 (1/s) | Calc. cP @170 (1/s) |
|---|---|---|---|---|---|---|---|---|---|
| 7 | 85 | 0.3485 | 0.1675 | 0.6514 | 0.1608 | 0.1904 | 824 | 454 | 321 |
| 37 | 72 | 0.2533 | 0.4550 | 0.9976 | 0.4344 | 0.5166 | 1574 | 794 | 534 |
| 67 | 75 | 0.2414 | 0.4868 | 0.9980 | 0.4644 | 0.5521 | 1610 | 804 | 537 |
| 97 | 76 | 0.2440 | 0.4876 | 0.9986 | 0.4653 | 0.5532 | 1629 | 815 | 546 |
| 127 | 75 | 0.2408 | 0.5012 | 0.9960 | 0.4782 | 0.5685 | 1654 | 825 | 552 |
| 157 | 74 | 0.2427 | 0.5054 | 0.9962 | 0.4822 | 0.5734 | 1680 | 839 | 562 |
| 187 | 74 | 0.2413 | 0.5141 | 0.9964 | 0.4905 | 0.5831 | 1700 | 848 | 567 |
| 217 | 75 | 0.2396 | 0.5156 | 0.9984 | 0.4918 | 0.5847 | 1694 | 844 | 564 |

TABLE 5C-continued

Test Data

| Time (min) | Temp (° F.) | n' | Kv dyne-s$^{n'}$/cm$^2$ | R$^2$ | K' dyne-s$^{n'}$/cm$^2$ | K' Slot dyne-s$^{n'}$/cm$^2$ | Calc. cP @40 (1/s) | Calc. cP @100 (1/s) | Calc. cP @170 (1/s) |
|---|---|---|---|---|---|---|---|---|---|
| 247 | 75 | 0.2416 | 0.5146 | 0.9976 | 0.4909 | 0.5837 | 1704 | 850 | 569 |
| 277 | 75 | 0.2378 | 0.5243 | 0.9976 | 0.5002 | 0.5945 | 1711 | 851 | 568 |
| 307 | 75 | 0.2320 | 0.5416 | 0.9981 | 0.5165 | 0.6137 | 1729 | 855 | 569 |
| 337 | 74 | 0.2353 | 0.5368 | 0.9983 | 0.5120 | 0.6085 | 1735 | 861 | 574 |
| 367 | 73 | 0.2389 | 0.5365 | 0.9961 | 0.5118 | 0.6084 | 1758 | 875 | 584 |
| 397 | 73 | 0.2355 | 0.5458 | 0.9971 | 0.5206 | 0.6187 | 1765 | 876 | 584 |
| 427 | 73 | 0.2357 | 0.5488 | 0.9983 | 0.5234 | 0.6221 | 1777 | 882 | 588 |
| 457 | 73 | 0.2350 | 0.5527 | 0.9987 | 0.5271 | 0.6265 | 1784 | 885 | 590 |
| 487 | 72 | 0.2330 | 0.5598 | 0.9978 | 0.5339 | 0.6345 | 1794 | 888 | 591 |
| 517 | 73 | 0.2349 | 0.5588 | 0.9973 | 0.5330 | 0.6334 | 1803 | 895 | 596 |
| 547 | 72 | 0.2377 | 0.5544 | 0.9982 | 0.5288 | 0.6286 | 1808 | 899 | 600 |
| 577 | 72 | 0.2336 | 0.5685 | 0.9957 | 0.5422 | 0.6443 | 1826 | 905 | 602 |
| 607 | 72 | 0.2355 | 0.5627 | 0.9958 | 0.5367 | 0.6379 | 1820 | 904 | 602 |
| 637 | 73 | 0.2344 | 0.5671 | 0.9973 | 0.5409 | 0.6428 | 1827 | 906 | 603 |
| 667 | 73 | 0.2270 | 0.5877 | 0.9976 | 0.5603 | 0.6655 | 1841 | 907 | 602 |
| 697 | 73 | 0.2254 | 0.5932 | 0.9980 | 0.5655 | 0.6716 | 1847 | 908 | 602 |
| 727 | 73 | 0.2300 | 0.5858 | 0.9968 | 0.5586 | 0.6637 | 1856 | 916 | 609 |
| 757 | 73 | 0.2299 | 0.5886 | 0.9964 | 0.5613 | 0.6669 | 1864 | 921 | 612 |
| 787 | 73 | 0.2304 | 0.5901 | 0.9978 | 0.5627 | 0.6685 | 1872 | 925 | 615 |
| 817 | 73 | 0.2315 | 0.5926 | 0.9982 | 0.5651 | 0.6715 | 1888 | 933 | 621 |
| 847 | 73 | 0.2321 | 0.5935 | 0.9965 | 0.5660 | 0.6725 | 1895 | 938 | 624 |
| 877 | 73 | 0.2283 | 0.6040 | 0.9981 | 0.5759 | 0.6842 | 1901 | 937 | 622 |
| 907 | 73 | 0.2222 | 0.6197 | 0.9982 | 0.5906 | 0.7013 | 1905 | 934 | 618 |
| 937 | 73 | 0.2276 | 0.6071 | 0.9974 | 0.5788 | 0.6876 | 1906 | 939 | 623 |

TABLE 6A

Test Description

| | |
|---|---|
| Test Name: | TEST-5175 |
| Fluid ID: | Hydro Gel 5L PIPELINE |
| Rotor Number: | R1 |
| Bob Number: | B1 |
| Bob Radius (cm) | 1.7245 |
| Bob Eff. Length (cm): | 7.62 |
| Pre-Test pH: | 7.67 |
| Post-Test pH: | 0 |
| Description: | SHEAR RATE: 50/S |

TABLE 6B

Formulation and Test Conditions

| Additives | Concentration | Units | Lot Number | Condition |
|---|---|---|---|---|
| 70% KCOOH | 1000 | gpt | | zero time @ temperature = 0.6 minutes |
| BIOCLEAR 200 | 0.05 | gpt | Russia | maximum sample temperature = 77.0° F. |
| Hydro Gel 5L | 80 | ppt | Batch K070315 | time at excess temperature = 0.0 minutes |
| Hydro Buffer 552L | 10 | gpt | | total test duration = 935.1 minutes initial viscosity = 1420.0 cP cool down viscosity = N.R. cP cool down temperature = N.R. ° F. |

TABLE 6C

Test Data

| Time (min) | Temp (° F.) | n' | Kv dyne-s$^{n'}$/cm$^2$ | R$^2$ | K' dyne-s$^{n'}$/cm$^2$ | K' Slot dyne-s$^{n'}$/cm$^2$ | Calc. cP @40 (1/s) | Calc. cP @100 (1/s) | Calc. cP @170 (1/s) |
|---|---|---|---|---|---|---|---|---|---|
| 5 | 73 | 0.1454 | 0.8335 | 0.9974 | 0.7919 | 0.9272 | 1897 | 867 | 551 |
| 35 | 74 | 0.1467 | 0.8248 | 0.9978 | 0.7836 | 0.9179 | 1888 | 864 | 549 |
| 65 | 74 | 0.1447 | 0.8326 | 0.9986 | 0.7910 | 0.9260 | 1890 | 863 | 548 |
| 95 | 74 | 0.1438 | 0.8384 | 0.9989 | 0.7965 | 0.9321 | 1896 | 865 | 549 |
| 125 | 73 | 0.1449 | 0.8375 | 0.9966 | 0.7956 | 0.9314 | 1902 | 869 | 552 |
| 155 | 73 | 0.1437 | 0.8427 | 0.9996 | 0.8006 | 0.9369 | 1906 | 870 | 552 |
| 185 | 73 | 0.1436 | 0.8426 | 0.9987 | 0.8005 | 0.9367 | 1904 | 869 | 551 |
| 215 | 73 | 0.1441 | 0.8423 | 0.9992 | 0.8002 | 0.9365 | 1908 | 871 | 553 |
| 245 | 73 | 0.1445 | 0.8430 | 0.9986 | 0.8008 | 0.9374 | 1912 | 873 | 555 |
| 275 | 73 | 0.1438 | 0.8463 | 0.9980 | 0.8040 | 0.9409 | 1914 | 874 | 555 |
| 305 | 73 | 0.1425 | 0.8508 | 0.9976 | 0.8082 | 0.9454 | 1914 | 872 | 553 |
| 335 | 73 | 0.1428 | 0.8515 | 0.9985 | 0.8089 | 0.9463 | 1918 | 874 | 555 |

TABLE 6C-continued

Test Data

| Time (min) | Temp (° F.) | n' | Kv dyne-s$^{n'}$/cm$^2$ | R$^2$ | K' dyne-s$^{n'}$/cm$^2$ | K' Slot dyne-s$^{n'}$/cm$^2$ | Calc. cP @40 (1/s) | Calc. cP @100 (1/s) | Calc. cP @170 (1/s) |
|---|---|---|---|---|---|---|---|---|---|
| 365 | 73 | 0.1430 | 0.8545 | 0.9985 | 0.8117 | 0.9497 | 1927 | 879 | 558 |
| 395 | 74 | 0.1422 | 0.8566 | 0.9989 | 0.8137 | 0.9518 | 1925 | 877 | 556 |
| 425 | 74 | 0.1427 | 0.8537 | 0.9987 | 0.8110 | 0.9488 | 1922 | 876 | 556 |
| 455 | 74 | 0.1418 | 0.8575 | 0.9991 | 0.8146 | 0.9527 | 1924 | 877 | 556 |
| 485 | 74 | 0.1425 | 0.8561 | 0.9984 | 0.8132 | 0.9513 | 1926 | 878 | 557 |
| 515 | 74 | 0.1442 | 0.8507 | 0.9979 | 0.8082 | 0.9459 | 1928 | 880 | 559 |
| 545 | 74 | 0.1434 | 0.8538 | 0.9978 | 0.8111 | 0.9491 | 1928 | 879 | 558 |
| 575 | 74 | 0.1445 | 0.8508 | 0.9977 | 0.8083 | 0.9461 | 1930 | 881 | 560 |
| 605 | 74 | 0.1444 | 0.8512 | 0.9990 | 0.8087 | 0.9466 | 1930 | 881 | 560 |
| 635 | 74 | 0.1442 | 0.8521 | 0.9983 | 0.8095 | 0.9474 | 1930 | 881 | 560 |
| 665 | 74 | 0.1439 | 0.8531 | 0.9985 | 0.8104 | 0.9485 | 1931 | 881 | 559 |
| 695 | 74 | 0.1443 | 0.8547 | 0.9985 | 0.8120 | 0.9504 | 1937 | 884 | 562 |
| 725 | 74 | 0.1417 | 0.8614 | 0.9988 | 0.8182 | 0.9569 | 1932 | 880 | 558 |
| 755 | 74 | 0.1435 | 0.8576 | 0.9983 | 0.8147 | 0.9533 | 1937 | 884 | 561 |
| 785 | 74 | 0.1428 | 0.8590 | 0.9980 | 0.8161 | 0.9547 | 1935 | 882 | 560 |
| 815 | 75 | 0.1442 | 0.8548 | 0.9977 | 0.8121 | 0.9505 | 1937 | 884 | 561 |
| 845 | 75 | 0.1432 | 0.8585 | 0.9987 | 0.8156 | 0.9543 | 1937 | 883 | 561 |
| 875 | 76 | 0.1432 | 0.8550 | 0.9982 | 0.8122 | 0.9504 | 1930 | 880 | 559 |
| 905 | 77 | 0.1458 | 0.8464 | 0.9982 | 0.8041 | 0.9416 | 1930 | 882 | 561 |
| 935 | 75 | 0.1437 | 0.8568 | 0.9986 | 0.8140 | 0.9526 | 1937 | 884 | 561 |

TABLE 7A

Test Description

| Test Name: | TEST-5162 |
|---|---|
| Fluid ID: | HPG PIPELINE |
| Rotor Number: | R1 |
| Bob Number: | B1 |
| Bob Radius (cm) | 1.7245 |
| Bob Eff. Length (cm): | 7.62 |
| Pre-Test pH: | 7.69 |
| Post-Test pH: | 7.68 |
| Description: | SHEAR RATE: 50/S |

TABLE 7B

Formulation and Test Conditions

| Additives | Con-centration | Units | Lot Number | Conditions |
|---|---|---|---|---|
| 70% KCOOH | 1000 | gpt | | zero time @ temperature = 0.6 minutes |
| BioClear 200 | 0.05 | gpt | Russia | maximum sample temperature = 77.0° F. |
| HPG-400DG | 80 | ppt | Batch # L0222098 | time at excess temperature = 0.0 minutes |
| Hydro Buffer 552L | 10 | gpt | | total test duration = 935.1 minutes |
| | | | | initial viscosity = 279.7 cP |
| | | | | cool down viscosity = N.R. cP |
| | | | | cool down temperature = N.R. ° F. |

TABLE 7C

Test Data

| Time (min) | Temp (° F.) | n' | Kv dyne-s$^{n'}$/cm$^2$ | R$^2$ | K' dyne-s$^{n'}$/cm$^2$ | K' Slot dyne-s$^{n'}$/cm$^2$ | Calc. cP @40 (1/s) | Calc. cP @100 (1/s) | Calc. cP @170 (1/s) |
|---|---|---|---|---|---|---|---|---|---|
| 5 | 75 | 0.5424 | 0.0344 | 0.9985 | 0.0334 | 0.0382 | 338 | 222 | 174 |
| 35 | 74 | 0.5372 | 0.0356 | 0.9985 | 0.0345 | 0.0395 | 343 | 225 | 176 |
| 65 | 74 | 0.5363 | 0.0358 | 0.9984 | 0.0348 | 0.0398 | 345 | 225 | 176 |
| 95 | 73 | 0.5369 | 0.0361 | 0.9982 | 0.0351 | 0.0402 | 348 | 228 | 178 |
| 125 | 73 | 0.5335 | 0.0369 | 0.9982 | 0.0359 | 0.0411 | 352 | 230 | 179 |
| 155 | 73 | 0.5414 | 0.0362 | 0.9986 | 0.0351 | 0.0402 | 354 | 233 | 183 |
| 185 | 73 | 0.5290 | 0.0374 | 0.9965 | 0.0363 | 0.0417 | 351 | 228 | 178 |
| 215 | 73 | 0.5213 | 0.0383 | 0.9989 | 0.0372 | 0.0427 | 350 | 226 | 175 |
| 245 | 73 | 0.5373 | 0.0364 | 0.9973 | 0.0354 | 0.0405 | 352 | 230 | 180 |
| 275 | 73 | 0.5348 | 0.0369 | 0.9977 | 0.0358 | 0.0411 | 353 | 231 | 180 |
| 305 | 73 | 0.5304 | 0.0374 | 0.9971 | 0.0363 | 0.0417 | 353 | 229 | 179 |
| 335 | 73 | 0.5243 | 0.0385 | 0.9989 | 0.0373 | 0.0429 | 355 | 230 | 178 |
| 365 | 73 | 0.5242 | 0.0386 | 0.9976 | 0.0374 | 0.0430 | 356 | 230 | 179 |
| 395 | 73 | 0.5266 | 0.0382 | 0.9981 | 0.0371 | 0.0426 | 356 | 230 | 179 |
| 425 | 73 | 0.5252 | 0.0386 | 0.9977 | 0.0374 | 0.0430 | 357 | 231 | 180 |
| 455 | 73 | 0.5307 | 0.0380 | 0.9982 | 0.0369 | 0.0423 | 359 | 233 | 182 |

TABLE 7C-continued

Test Data

| Time (min) | Temp (° F.) | n' | Kv dyne-s$^{n'}$/cm$^2$ | R$^2$ | K' dyne-s$^{n'}$/cm$^2$ | K' Slot dyne-s$^{n'}$/cm$^2$ | Calc. cP @40 (1/s) | Calc. cP @100 (1/s) | Calc. cP @170 (1/s) |
|---|---|---|---|---|---|---|---|---|---|
| 485 | 72 | 0.5272 | 0.0384 | 0.9980 | 0.0373 | 0.0428 | 358 | 232 | 181 |
| 515 | 72 | 0.5276 | 0.0384 | 0.9977 | 0.0373 | 0.0428 | 358 | 233 | 181 |
| 545 | 72 | 0.5251 | 0.0388 | 0.9983 | 0.0376 | 0.0432 | 359 | 232 | 181 |
| 575 | 72 | 0.5389 | 0.0371 | 0.9969 | 0.0360 | 0.0413 | 361 | 236 | 185 |
| 605 | 72 | 0.5484 | 0.0347 | 0.9987 | 0.0337 | 0.0385 | 348 | 230 | 181 |
| 635 | 73 | 0.5559 | 0.0338 | 0.9981 | 0.0329 | 0.0375 | 349 | 232 | 183 |
| 665 | 73 | 0.5595 | 0.0330 | 0.9982 | 0.0321 | 0.0365 | 345 | 230 | 182 |
| 695 | 73 | 0.5512 | 0.0339 | 0.9988 | 0.0330 | 0.0377 | 344 | 228 | 180 |
| 725 | 73 | 0.5607 | 0.0332 | 0.9980 | 0.0323 | 0.0367 | 348 | 233 | 184 |
| 755 | 73 | 0.5509 | 0.0344 | 0.9979 | 0.0334 | 0.0382 | 349 | 231 | 182 |
| 785 | 73 | 0.5536 | 0.0338 | 0.9989 | 0.0328 | 0.0375 | 346 | 230 | 181 |
| 815 | 73 | 0.5390 | 0.0357 | 0.9963 | 0.0347 | 0.0397 | 347 | 228 | 178 |
| 845 | 73 | 0.5513 | 0.0344 | 0.9968 | 0.0335 | 0.0382 | 349 | 232 | 183 |
| 875 | 73 | 0.5529 | 0.0344 | 0.9983 | 0.0334 | 0.0382 | 351 | 233 | 184 |
| 905 | 72 | 0.5477 | 0.0352 | 0.9986 | 0.0342 | 0.0391 | 353 | 233 | 183 |
| 935 | 73 | 0.5532 | 0.0343 | 0.9981 | 0.0333 | 0.0380 | 350 | 233 | 183 |

Figure 8A:
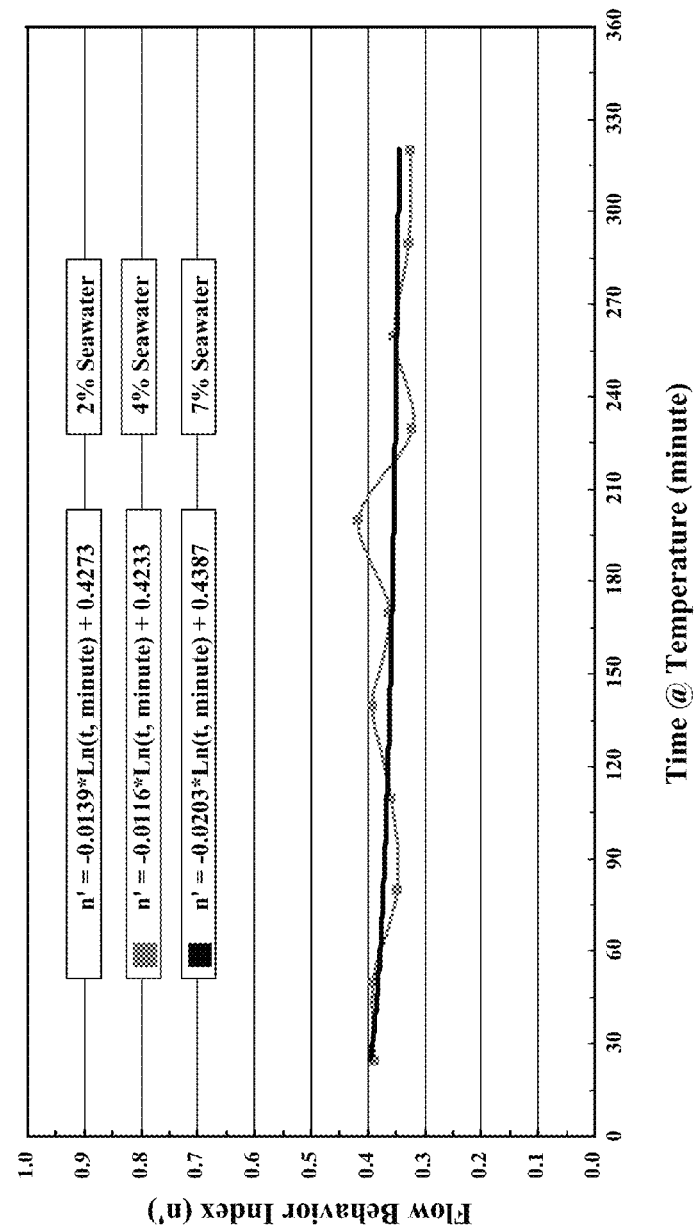
FIG. 8A a plot of rheological data for a gelled formate composition of this invention.
Figure 8B:
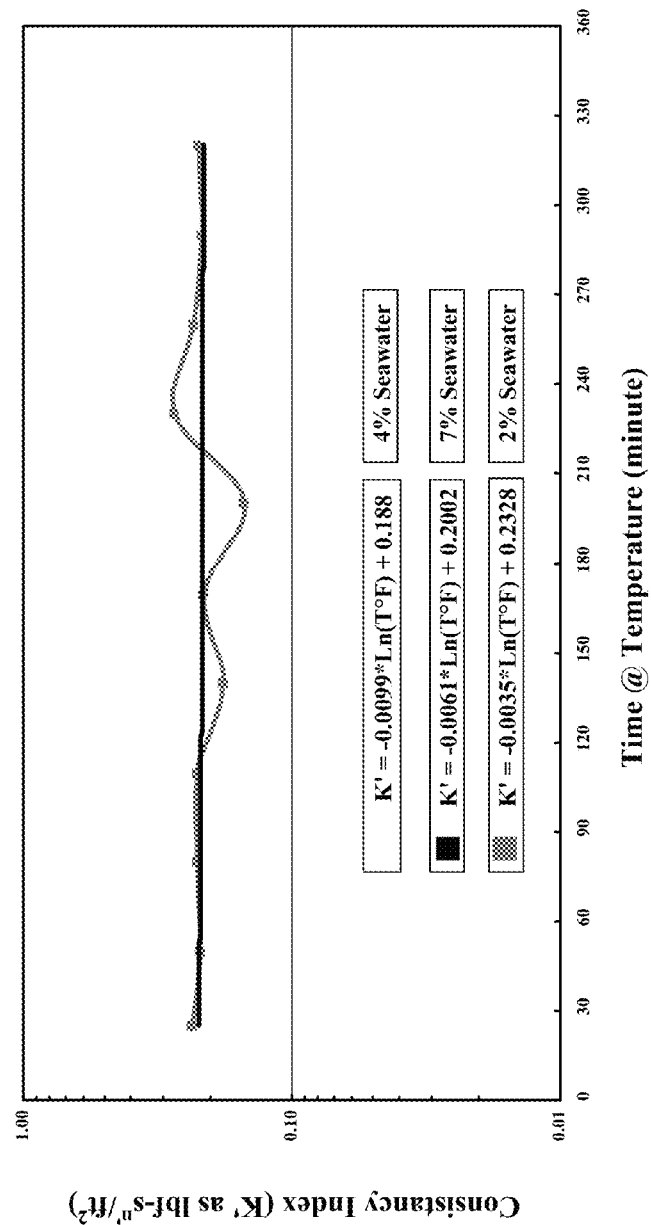
FIG. 8B a plot of rheological data for a gelled formate composition of this invention.

Additional rheological properties are shown in Tables 8A&B and graphically in FIGS. 8A&B.

TABLE 8A

Rheology @ 200° F. (93° C.)

| time minute | n' | K' lb$_f$·s$^{n'}$/ft$^2$ | $\mu_a$ @ 100/s | cP |
|---|---|---|---|---|
| 0 |  |  | 618 | 521 |
| 15 | 0.390 | 0.2233 | 590 | 493 |
| 30 | 0.380 | 0.2209 | 565 | 471 |
| 45 | 0.374 | 0.2195 | 544 | 452 |
| 60 | 0.370 | 0.2185 | 527 | 438 |
| 75 | 0.367 | 0.2177 | 512 | 427 |
| 90 | 0.365 | 0.2171 | 501 | 420 |
| 105 | 0.363 | 0.2165 | 492 | 415 |
| 120 | 0.361 | 0.2160 | 486 | 412 |
| 135 | 0.359 | 0.2156 | 481 | 411 |
| 150 | 0.358 | 0.2153 | 479 | 412 |
| 165 | 0.356 | 0.2149 | 479 | 414 |
| 180 | 0.355 | 0.2146 | 481 | 417 |
| 195 | 0.354 | 0.2143 | 484 | 420 |
| 210 | 0.353 | 0.2141 | 488 | 423 |
| 225 | 0.352 | 0.2138 | 494 | 425 |
| 240 | 0.351 | 0.2136 | 500 | 427 |
| 255 | 0.350 | 0.2134 | 507 | 427 |
| 270 | 0.349 | 0.2132 | 515 | 426 |
| 285 | 0.349 | 0.2130 | 522 | 422 |
| 300 | 0.348 | 0.2128 | 530 | 416 |

TABLE 8B

Rheological Conditions and Results

R = less10% gel
Q = 30# gel
$\mu_a = -1E-05 * t^3 + 0.0087 * t^2 - 2.0024 * t + 617.83$
$\mu_a = -2E-05 * t^3 + 0.0115 * t^2 - 1.9994 * t + 520.93$ Table 9 tabulates a summary of pre and post test conditions, test values, components used, etc. set forth in Table 1A-8B above.

TABLE 9

Testing Results of Gelled Compositions of This Invention

| Additive or measurement | Gellant Loading Variance gallon/1,000 gallon | | | | | KCl Loading Variance gallon/1,000 gallon | | |
|---|---|---|---|---|---|---|---|---|
| Test Number | (1) | (4) | (5) | (6) | (7) | (1) | (2) | (3) |
| variable parameter % | 0% | 10% | −10% | 20% | −20% | 2% | 4% | 7% |
| water | Sparkletts Distilled Water | | | | | Sparkletts Distilled Water | | |
| Bio-Clear ® 200 | 0.05 |  |  |  |  | 0.05 |  |  |
| KCl [% (lbm)] |  |  | 2 (167) |  |  | 2 (167) | 4 (334) | 7 (583) |
| WNE-342LN[‡] | 1.0 |  |  |  |  | 1.0 |  |  |
| WPA-556L[‡] | 0.25 |  |  |  |  | 0.25 |  |  |
| WGA-11L[‡] | 7½ | 8¼ | 6¾ | 9 | 6 | 7½ |  |  |
| hydration pH | 4.78 | 4.75 | 4.72 | 4.72 | 4.76 | 4.78 | 4.75 | 4.87 |
| base gel viscosity (cP) | 32.1 | 33.4 | 25.6 | 41.0 | 19.5 | 32.1 | 29.7 | 29.1 |
| WGA-160L[‡] | 1.5 |  |  |  |  | 1.5 |  |  |
| WPB-584L[‡] | 2.0 |  |  |  |  | 2.0 |  |  |
| buffer pH | 11.58 | 11.60 | 11.63 | 11.72 | 11.56 | 11.58 | 11.58 | 11.87 |
| WXL-101L[‡] | 1.0 |  |  |  |  | 1.0 |  |  |
| crosslink pH | 11.54 |  |  |  |  | 11.54 |  |  |
| test temperature [° F. (° C.)] |  |  | 200 (93) |  |  |  | 200 (93) |  |
| post test pH | 11.04 |  |  |  |  | 11.04 |  |  |

[‡]These products are available from Clearwater International, LLC of Elmendorf, Texas Field Mixing The gelled composition can be prepared in the field using dry polymer, but using dry polymer required high shear to active a desired gelled composition. In certain embodiments, the dry polymer is encapsulated in a gel membrane to assist in hydration as the encapsulate erodes. In other embodiments, polymer slurries or suspensions are readily dispersed with little shear. In other embodiments, field mixing of the formulations is accomplished using an "on the fly" or "continuous mix" process. In this type of process, all additives are metered concomitantly at strategic points as the formate solution is injected into the pipeline. A detailed field mixing procedure as shown in attachment 1 is recommended for delivery of these formulations.

Xanthan—CMHPG Formulation

This example illustrates a pipeline fluid mixing procedure for preparing a gelled potassium formate composition of this invention.

Chemicals

The following chemical were used in the preparation of the composition:

70% w/w potassium formate (KCOOH)
Hydro Buffer 552L (hydration buffer)
Hydro Gel 5L (mineral oil base gelling agent)
Clarified xanthan gum slurry (mineral oil base)

Equipment

The following pieces of equipment were used in the preparation of the composition:

Positive displacement injection (metering) pumps or peristaltic pumps
Multi-stage Centrifugal Pump
Static Mixers (In line static mixers)
Additive micro-motion flow meters
Mass flow meter Potassium Formate Storage Tank(s)

The composition was prepared in a "continuous mix" process, where all components are be injected concomitantly into the formate solution at a volume ratio base on formate injection rate.

The injection points for all components to be metered into the process flow line are disposed after the single stage centrifugal pump and before the centrifugal pump. Static mixers were installed between each centrifugal pump and downstream of each chemical additive injection point to facilitate mixing and to assure additive dispersion while the fluid stream is transiting to the pipeline.

Figure 5:
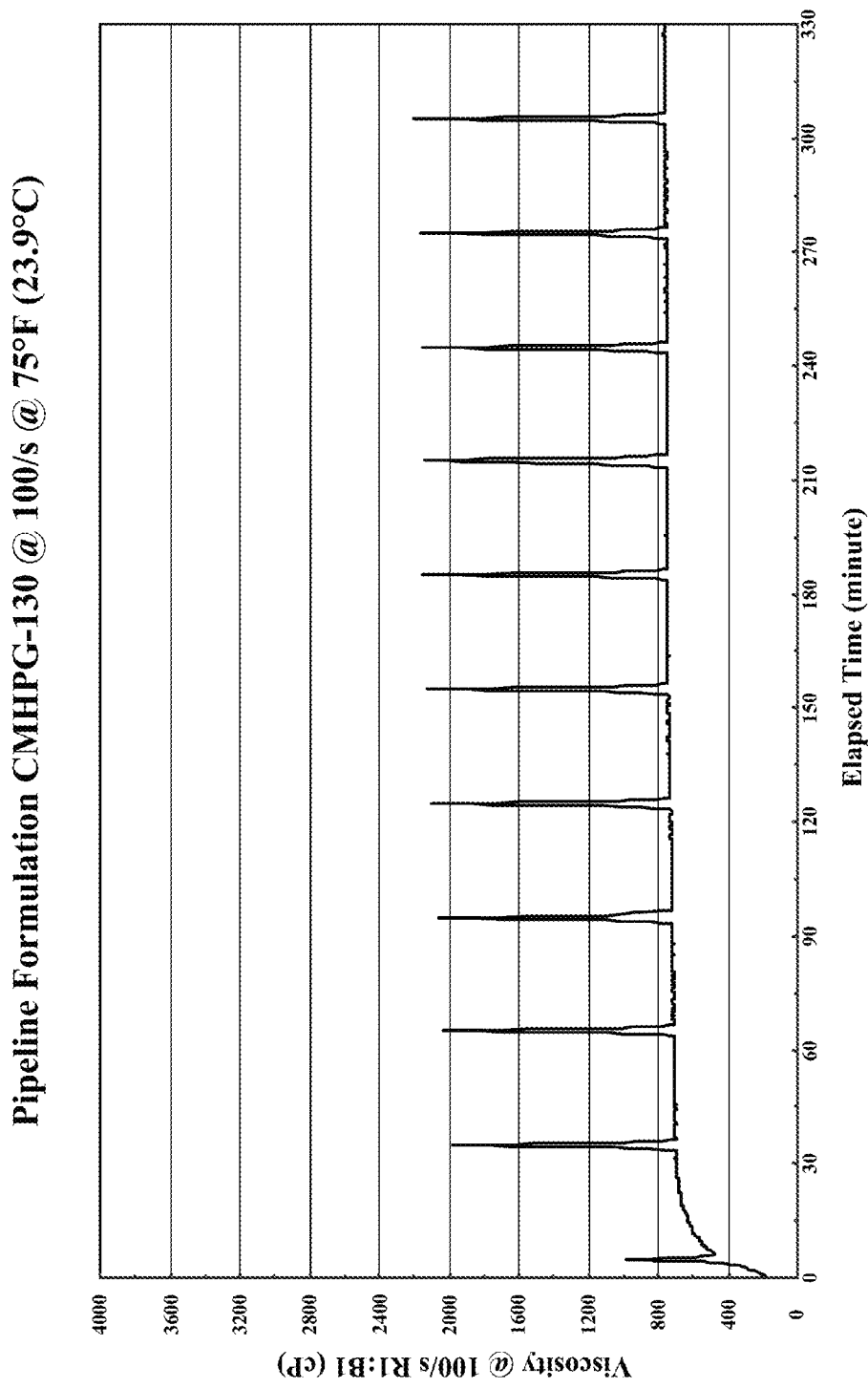
FIG. 5 a plot of the testing of a CMHPG-130 gelled formate composition@ 100/s.
Figure 6:
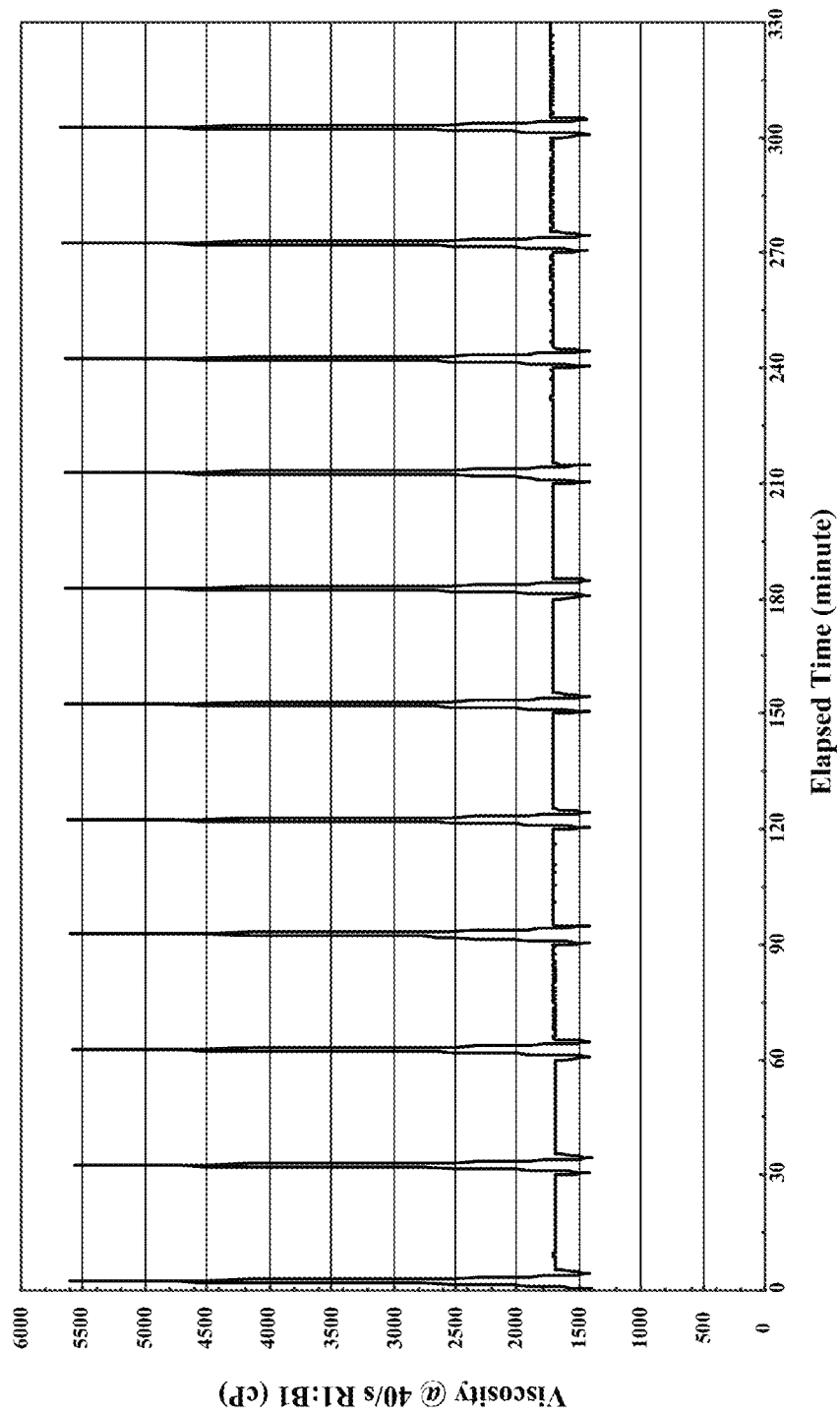
FIG. 6 a plot of the testing of a 20 gpt WGA-5L gelled formate composition.
Figure 7:
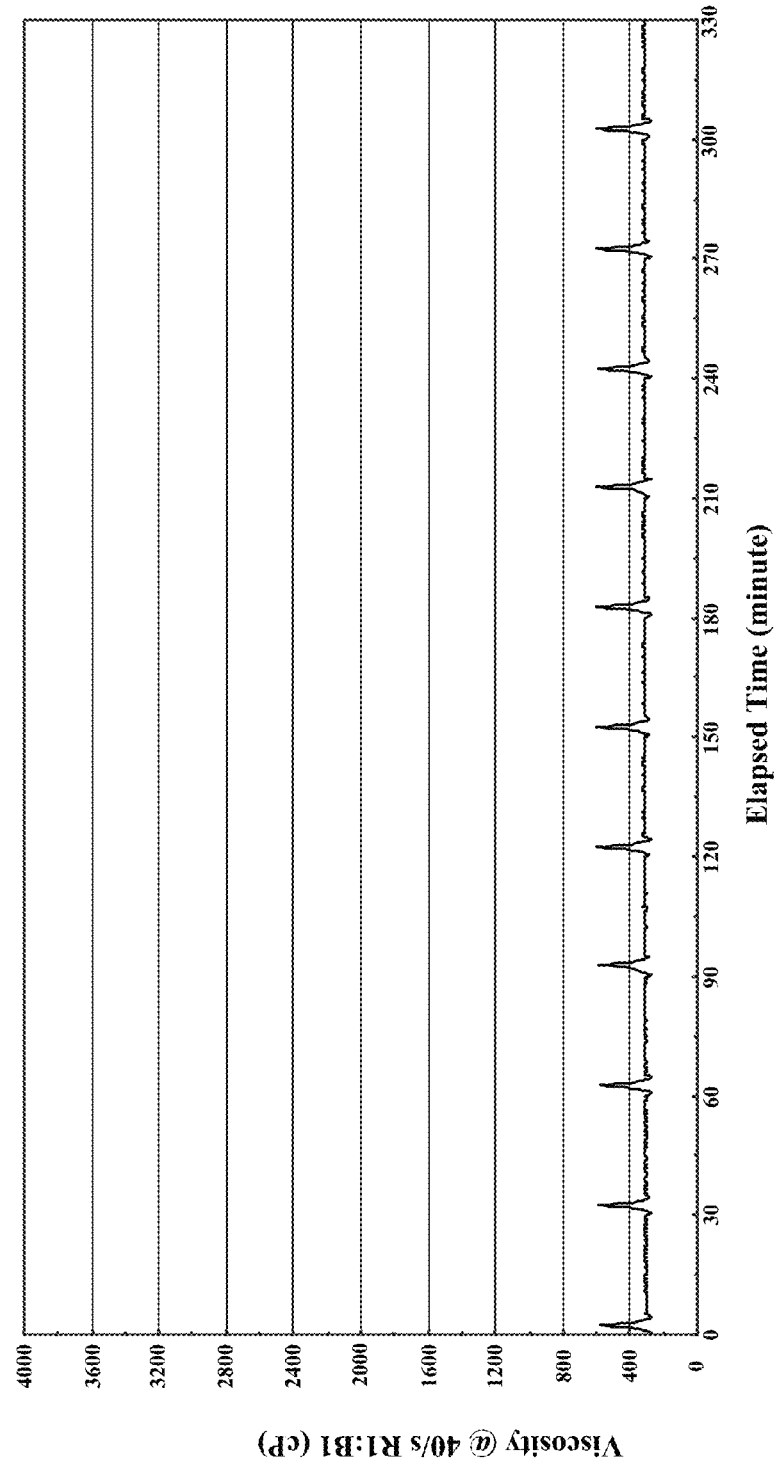
FIG. 7 a plot of the testing of a HPG gelled formate composition.

Meter the 70 wt. % potassium formate base solution (first component) from the storage tank using a single stage centrifugal pump into the pipeline at the predetermined rate using a multistage centrifugal pump (FIG. 5).

Inject hydration buffer Hydro Buffer 552L (second component) at 10 gallons per thousand gallons (gpt) or 10 liters per cubic meter (10 L/m$^3$) into the potassium formate solution. The total or combined rate of the chemical(s) being injected is maintained equal to the initial potassium formate rate, requiring the potassium formate rate to be decreased by the volume of hydration buffer being injected into the stream. Delivering the additives in this manner ensures a constant delivery of the final blended formulation. In certain embodiments, micromotion flow meters are used to maintain accurate injection rates of additive being deliver to the pipeline process flow stream.

Inject the gelling agent Hydro Gel 5L (third component) to the formulation downstream of the hydration buffer Hydro Buffer 552L and a first static mixer at a rate of 16 gpt (16 L/m$^3$). Reduce the rate of the formate solution as described in step three of this procedure.

Inject the clarified xanthan gum slurry (forth and final component) of the formulation downstream of gelling agent Hydro Gel 5L and a second static mixer at a rate of 4 gpt (4 L/m$^3$). Reduce the rate of the formate solution as described in step three of this procedure.

Meter the final composition through the multistage centrifugal pump to ensure rapid hydration of the gelling agent and the polymer slurry and fast fluid viscosity development of the final composition without the need for a hydration holding tank.

Inject this final hydrated mixture into the pipeline for drying.

CONCLUSION

Adjusting the pH of the potassium formate solutions to pH between about pH 7 and pH 7.5 permits effective and efficient hydration of guar and/or guar derivative polymers.

Highest viscosity stability at 935 minutes and at 70° F. to 75° F. was demonstrated with carboxymethylhydroxypropylguar and carboxymethylhydroxypropylguar xanthan polymer blends.

Generally, the polymer or polymer blend is added to the format solution in an amount of at least 40 pounds of polymer per thousand gallons of total solution (ppt). In other embodiments, the polymer or polymer blend is added to the format solution in an amount of at least 50 ppt. In other embodiments, the polymer or polymer blend is added to the format solution in an amount of at least 60 ppt. In other embodiments, the polymer or polymer blend is added to the format solution in an amount of at least 70 ppt. In other embodiments, the polymer or polymer blend is added to the format solution in an amount of at least 80 ppt.

In certain embodiments, a dry polymer or dry polymer blend is used, generally accompanied by high shear mixing with or without a holding tank to ensure complete gellation. In other embodiments, polymer suspensions in an oil such as mineral oil or a glycol is used to disperse the polymer or polymer blend into the formate solution.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for conditioning pipelines comprising the steps of:
    filling a pipeline or portion thereof with an aqueous composition including a metal ion formate salt and an effective amount of a gelling agent, where the effective amount is sufficient to form a gelled composition having increased viscosity and where the gelled composition provides a 100% (360 degree) coverage of the pipe wall, and
    pressurizing the pipeline or portion thereof filled with the gelled composition to a desired test pressure, where the formate salt in the gelled composition reduces gas hydrate formation in the pipeline or portion thereof during the pressurizing step.

2. The method of claim 1, wherein the gas hydrate comprises methane hydrate.

3. The method of claim 1, wherein the metal ion formate salt is a compound of the formula $(HCOO^-)_n M^{n+}$ and mixtures thereof, where M is a metal ion and n is the valency of the metal ion.

4. The method of claim 3, wherein the metal ion is selected from the group consisting of an alkali metal ion, an alkaline metal ion, a transition metal ion, a lanthanide metal ion, and mixtures thereof.

5. The method of claim 4, wherein the alkali metal ion is selected from the group consisting of $Li^+$, $Na^+$, $K^+$, $Rb^+$, $Cs^+$, and mixtures thereof.

6. The method of claim 5, wherein the alkali metal ion is $K^+$.

7. The method of claim 4, the alkaline metal ion is selected from the group consisting of $Mg^{2+}$, $Ca^{2+}$, $Sr^{2+}$, $Ba^{2+}$ and mixtures thereof.

8. The method of claim 4, wherein the transition metal ion is selected from the group consisting of $Ti^{4+}$, $Zr^{4+}$, $Hf^{4+}$, $Zn^{2+}$ and mixtures thereof.

9. The method of claim 4, wherein the lanthanide metal ion is selected from the group consisting of $La^{3+}$, $Ce^{4+}$, $Nd^{3+}$, $Pr^{2+}$, $Pr^{3+}$, $Pr^{4+}$, $Sm^{2+}$, $Sm^{3+}$, $Gd^{3+}$, $Dy^{2+}$, $Dy^{3+}$, and mixtures thereof.

10. The method of claim 1, further comprising:
recovering the gelled composition,
breaking the gelled composition,
filtering the gelled composition, and
reformulating the gelled composition for reuse.

11. The method of claim 1, further comprising:
flushing the gelled composition from the pipeline or portion thereof.

12. The method of claim 1, wherein the effective amount is between about 5% w/w of metal ion formate salt to water and a saturated or supersaturated solution of the metal ion formate salt in water.

13. The method of claim 1, wherein the effective amount is between about 25% w/w of metal ion formate salt to water and a saturated or supersaturated solution of the metal ion formate salt in water.

14. The method of claim 1, wherein the effective amount is between about 45% w/w of metal ion formate salt to water and a saturated or supersaturated solution of the metal ion formate salt in water.

15. The method of claim 1, wherein the effective amount is between about 65% w/w of metal ion formate salt to water and a saturated or supersaturated solution of the metal ion formate salt in water.

16. The method of claim 1, wherein the gelling agent comprises a hydratable polymer.

17. The method of claim 16, wherein the hydratable polymer is selected from the group consisting of polysaccharide polymers, high-molecular weight polysaccharides composed of mannose and galactose sugars, hydropropyl guar (HPG), hydroxypropylcellulose (HPC), carboxymethyl guar (CMG), carboxymethylhydropropyl guar (CMHPG), hydroxyethylcellulose (HEC) or hydroxypropylcellulose (HPC), carboxymethylhydroxyethylcellulose (CMHEC), xanthan, scleroglucan, polyacrylamide, polyacrylate polymers and copolymers and mixtures thereof.

* * * * *